United States Patent
Isogai et al.

(10) Patent No.: US 8,127,144 B2
(45) Date of Patent: Feb. 28, 2012

(54) PROGRAM LOADER OPERABLE TO VERIFY IF LOAD-DESTINATION INFORMATION HAS BEEN TAMPERED WITH, PROCESSOR INCLUDING THE PROGRAM LOADER, DATA PROCESSING DEVICE INCLUDING THE PROCESSOR, PROMGRAM LOADING METHOD, AND INTEGRATED CIRCUIT

(75) Inventors: Norihisa Isogai, Aichi (JP); Takeshi Saijo, Mie (JP); Takashi Suzuki, Aichi (JP)

(73) Assignee: Panasonic Corporation, Osaka (JP)

( * ) Notice: Subject to any disclaimer, the term of this patent is extended or adjusted under 35 U.S.C. 154(b) by 991 days.

(21) Appl. No.: 11/545,597

(22) Filed: Oct. 11, 2006

(65) Prior Publication Data

US 2007/0083768 A1 Apr. 12, 2007

(30) Foreign Application Priority Data

Oct. 12, 2005 (JP) .................................. 2005-297521

(51) Int. Cl.
*G06F 11/30* (2006.01)
*G06F 12/14* (2006.01)

(52) U.S. Cl. ....................................................... 713/187
(58) Field of Classification Search .................... 713/187
See application file for complete search history.

(56) References Cited

U.S. PATENT DOCUMENTS

| 6,141,756 | A | 10/2000 | Bright et al. | |
|---|---|---|---|---|
| 6,802,006 | B1 * | 10/2004 | Bodrov | 713/187 |
| 2004/0107237 | A1 | 6/2004 | Kashiwada | |
| 2005/0198521 | A1 * | 9/2005 | Nakazawa | 713/194 |

FOREIGN PATENT DOCUMENTS

| JP | 63-178355 | 7/1988 |
|---|---|---|
| JP | 2002-507307 | 3/2002 |
| JP | 2005-222418 | 8/2005 |
| WO | 02/057904 | 7/2002 |

* cited by examiner

*Primary Examiner* — Edan Orgad
*Assistant Examiner* — Harris Wang
(74) *Attorney, Agent, or Firm* — Wenderoth, Lind & Ponack, L.L.P.

(57) ABSTRACT

A program loader for loading a program onto a memory in accordance with load-destination information. The program loader including an obtaining unit obtaining the load-destination information from a recording medium in which the program is recorded, a verifying unit verifying whether or not the load-destination information has been tampered with, and a loading unit loading the program. The load-destination information indicates a memory area which is part of an address space in the memory, wherein an execution image of the program is to be stored in the address space, and if when the verifying unit verifies that the load-destination information has not been tampered with, the loading unit generates, as the loading of the program, the execution image in the memory area indicated by the load-destination information, such that the execution image is executed.

8 Claims, 18 Drawing Sheets

PROGRAM LOADER OPERABLE TO VERIFY IF LOAD-DESTINATION INFORMATION HAS BEEN TAMPERED WITH, PROCESSOR INCLUDING THE PROGRAM LOADER, DATA PROCESSING DEVICE INCLUDING THE PROCESSOR, PROMGRAM LOADING METHOD, AND INTEGRATED CIRCUIT

BACKGROUND OF THE INVENTION (1) Field of the Invention

The present invention relates to a technology of loading a program into a specified area.

(2) Description of the Related Art

There have been disclosed technologies regarding devices or methods for loading a program safely onto memory in the processor.

It should be noted here that the "loading" indicates generating an execution image (object, instance) of a program, which is recorded in a recording medium, in a memory area such that the execution image can be executed by the processor.

For example, in a method of loading a program from an external storage device into the processor, the program is encrypted, and authentication information certifying the authenticity of the program is attached thereto before the program is stored in the external storage device. The program is decrypted and authenticated before the program is run by the processor.

The above-described construction is able to prevent an undesired program, such as a program that exposes the contents of other programs running on the same processor, from being run on the processor.

Meanwhile, the memory, which is the load destination of the program, is divided into two types: a secure memory having a secure mechanism; and a normal memory not having such a secure mechanism.

For example, to achieve a copyright protection method with software, it is required that a program is loaded into an environment in which it is difficult to analyze software or to run a program that has been tampered with. In this case, the program loader needs to load a target-program onto a secure memory. Here, it is possible to increase the resistance against the program analysis or tampering by a party outside the processor, by loading the program onto a RAM that is located within the processor. This is because the construction of the processor physically conceals a bus that is a data transmission/reception path between the RAM and a calculator of the processor. That is to say, it is possible to minimize the danger of the program being exposed or tampered, by adopting a mechanism in which a program, which is implemented with an algorithm that needs to be concealed, is first loaded onto a secure RAM provided within the processor so as to be run thereafter.

Meanwhile, the above-described secure memory may be used as a temporary storage destination to store a program that is obtained as a result of decrypting an encrypted program. And the computer system causes the processor to run the program stored in such a storage as an authentic program. Suppose here that a party with a malicious intention has rewritten a load-destination address. In this case, the program loader loads the program into a secure area in accordance with the tampered load-destination address, and the processor attempts to run the program in the secure area. However, a malfunction may occur in the processor since the program may have been loaded at a wrong position by the rewriting of the load-destination address. This gives a clue to an attack to the system by the third party.

Also, there would be another problem. Even if a secure area is provided, some programs may be loaded into a memory space (normal memory) other than the secure memory. With respect to a program that is stored in the normal memory, there is no way to discern whether the program was stored in the normal memory since the program need not to be stored in the secure area, or the program was stored in the normal memory since the load-destination address of the program had been tampered with by a party with a malicious intention. If the loading of the latter case is permitted, it means that it is permitted that disadvantageous acts against the program may occur, and in this case, the meaning of providing the secure area is almost lost.

SUMMARY OF THE INVENTION

The object of the present invention is therefore to provide a program loader that increases the reliability in protecting the contents of the secure area and does not give a clue to a malicious attack by the third party, and to provide a program loader that prevents a tampered program from being loaded onto the normal memory.

The above object is fulfilled by a program loader for loading a program onto a memory in accordance with load-destination information, the program loader including: an obtaining unit operable to obtain the load-destination information from a recording medium in which the program is recorded; a verifying unit operable to verify whether or not the load-destination information has been tampered with; and a loading unit operable to load the program. The load-destination information indicates a memory area which is part of an address space in the memory, wherein an execution image of the program is to be stored in the address space, and if the verifying unit verifies that the load-destination information has not been tampered with, the loading unit generates, as the loading of the program, the execution image in the memory area indicated by the load-destination information, such that the execution image is executed.

With the above-stated construction in which it is verified whether or not the information indicating the load-destination area has been tampered with, if it is judged that the information has been tampered with, it is possible to prevent the program, which was loaded in accordance with the tampered information, from being run by the processor, by invalidating the secure area in which the program is loaded or by not performing the loading of the program. This makes it possible to prevent such a program that may give a clue to a malicious attack, from being run. This construction thus increases the reliability in protecting the contents of the secure area and increases the stableness of the system.

Also, the above-stated construction verifies whether or not the information indicating the load-destination area has been tampered with. Accordingly, when a program is loaded onto a normal memory other than the secure area, it is possible to discern whether the program is stored in the normal memory since it need not to be stored in the secure area, or since there had been a tampering by a malicious party. And in the latter case, the loading of the program can be cancelled. This makes it possible to prevent disadvantageous acts that would occur if the program were loaded onto the normal memory.

Here, another problem arises when an attempt is made to verify whether or not the information indicating the load-destination area has been tampered with. That is to say, the verification requires extra processes during the loading, such as an execution of a hash algorithm. This extends the time period from the issuance of the program run instruction by the user to the actual start of the program, causing the response to decrease. This problem is solved by the above-stated program loader, wherein the program is recorded in the recording medium in a form of a load object, the load object includes the program, the load-destination information, and an authenticator, the authenticator is a value that, on a presumption that any of the program and the information has not been tampered with, is unique to a combination of the program and the load-destination information, and the authenticator is calculated in advance before the program is provided to a user, and the verification on whether or not the information has been tampered with is, when the program is executed, achieved by calculating a value that is unique to the combination of the program and the load-destination information and comparing the calculated value with the authenticator.

When a hash value or the like is used as an authenticator to verify whether or not the information indicating the load-destination area has been tampered with, a calculation process for the verification is reduced to a calculation for verifying the program itself. With this construction, the reduction in the response does not occur even if the verification on whether or not the information has been tampered with is added.

In the above-stated program loader, the program may be recorded in a recording medium in a form of a load object, the load object includes the program, the load-destination information, and an authenticator, the authenticator is a value that, on a presumption that the program has not been tampered with, is unique to the program, and the authenticator is calculated in advance before the program is provided to a user, data at a predetermined position of the program is replaced with a result of a reversible operation performed using the data at the predetermined position and the load-destination information, after the authenticator is calculated and before the program is provided to the user, and the verification on whether or not the information has been tampered with is achieved, when the program is executed, by replacing the data at the predetermined position of the program with a result of a reversed calculation of the reversible operation that is performed using the data at the predetermined position and the load-destination information, calculating a value that is unique to the program after the data at the predetermined position is replaced with the result of the reversed calculation, and comparing the calculated value with the authenticator.

With the above-stated construction, in addition to the advantageous effect of the earlier-stated construction, even if a third party with a malicious intention gets to know the format of the program, it is further possible to make the third party difficult to create a program that can be correctly loaded, by keeping the predetermined position and the method of performing the reversible operation in secret.

The above-stated program loader may further comprise: an area verifying unit operable to verify, if the program were loaded onto the memory in accordance with the information indicating the load-destination area, whether or not the loaded program would be included in a secure area within the memory, wherein the verification on whether or not the information has been tampered with is performed if the area verifying unit has verified that the loaded program is included in the secure area. The above-stated program loader may further comprise: an area verifying unit operable to verify, if the program were loaded onto the memory in accordance with the load-destination information, whether or not the loaded program would be included in a secure area within the memory, wherein the verification on whether or not the information has been tampered with is performed if the area verifying unit has verified that the loaded program is included in the secure area.

Here, the verification performed by the verifying unit is, for example, a data verification process in which a reliable hash algorithm is used, and which would increase the processing load, and as the data size of the verification target becomes larger, the cost for the verification process becomes higher. In contrast, the verification performed by the area verifying unit is a comparison between areas, and the processing load is small. As described above, in general, the verification performed by the area verifying unit is smaller than the verification performed by the verifying unit in the processing load. Accordingly, by performing the verification by the area verifying unit prior to the verification by the verifying unit, it is possible to eliminate the need to always perform the verification by the verifying unit. This reduces the processing cost.

In the above-stated program loader, if the load object includes restore information that is used to restore load-destination information that has been tampered, the obtaining unit may obtain the load-destination information by performing a calculation process using the restore information, and if the load object includes the restore information, a target of the reversible operation is the load-destination information that is obtained as a result of the calculation process.

In the above-stated program loader, if the load object includes restore information that is used to restore load-destination information that has been tampered, the obtaining unit obtains the load-destination information by performing a calculation process using the restore information, and if the load object includes the restore information, a target of the reversible operation is the load-destination information that is obtained as a result of the calculation process.

With the above-stated construction, the verifying unit is able to re-verify the program using the restored information indicating the load-destination area, and if the verification result is success, the re-loading process is simplified. This makes is possible to make the loading process more efficient.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

The following describes embodiments of the present invention, with reference to the attached drawings.

Embodiment 1

<Construction>

Figure 1:
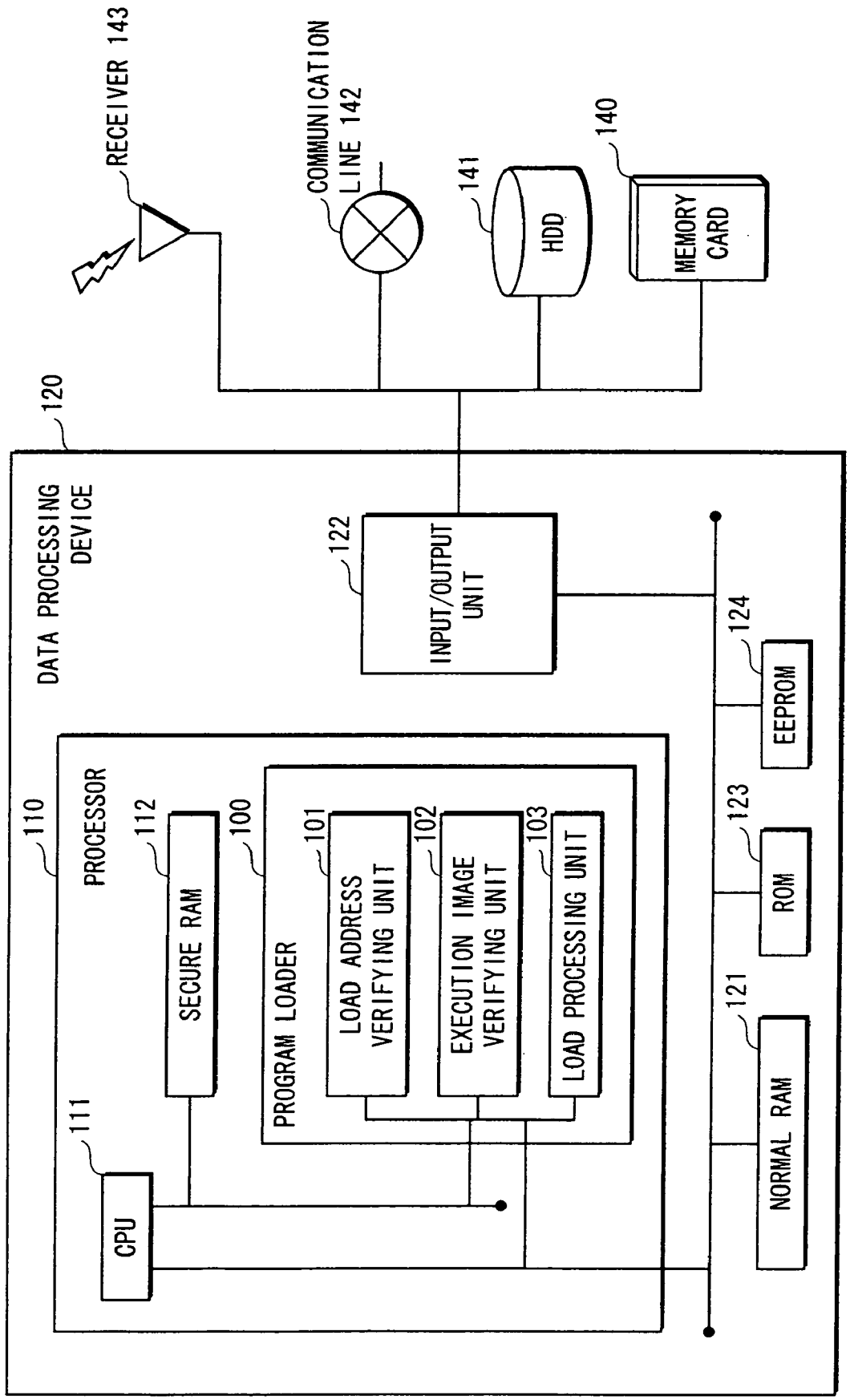
FIG. 1 shows the construction of a program loader, a processor, and a data processing device in Embodiment 1 of the present invention.

FIG. 1 shows a program loader 100, a processor 110 that includes the program loader 100, and a data processing device 120 that includes the processor 110, in Embodiment 1.

The data processing device 120 includes the processor 110, a normal RAM 121, and an input/output unit 122.

The processor 110 includes a CPU 111, a secure RAM 112, and the program loader 100.

The CPU 111 executes a program by fetching a program code or data from the secure RAM 112 or the normal RAM 121 that is connected to the outside of the processor 110.

The secure RAM 112 is a RAM that is provided with some secure mechanism, and into which a program to be protected is loaded. The secure mechanism is typically achieved by (a) a software mechanism in which the whole RAM is encrypted and is decrypted when it is actually used, or (b) a hardware mechanism in which a bus is shut off so that the memory cannot be accessed. However, the secure mechanism is not limited to these ones, but may be achieved by any method. In the present embodiment, as a hardware implementation, for example, the bus is provided with a switch so that if it is verified that no tampering has been made, the bus is enabled by the switch, and the CPU 111 can access the secure RAM 112. It should be noted here that the program to be protected is a program having a high security level. More specifically, the program to be protected is a program that contains right information and key information, or a rich content. It is preferable that the secure RAM 112 is connected to the CPU 111 and the program loader 100 via internal buses so as to prevent data stored in the secure RAM 112 from leaking outside of the processor. As described here, the processor 110 provides a protected environment for executing the program.

The program loader 100 includes a load address verifying unit 101, an execution image verifying unit 102, and a load processing unit 103.

The load address verifying unit 101 has a function to verify whether or not a load address space specified as a load destination of a load-target program is included in an address space assigned to the secure RAM 112. With this function, it is possible, if a load address is mistakenly specified to be in an area other than the area of the secure RAM, to prevent a program with high security level from being transferred to a RAM other than the secure RAM 112. It should be noted here that the load address space is an area that extends from the start address to the end address of a space in which a program is loaded, and is obtained from a load address and a load size.

The execution image verifying unit 102 has a function to verify whether or not any of a load-target program, a load address, and a load size has been tampered with. A specific method of verification will be described later. With this function, it is possible to prevent a program, which is to perform an unauthorized process, from being executed. The verification of tampering is achieved by using, for example, a SHA-1 algorithm being a hash value generation algorithm, or a MAC generation algorithm using the CBC mode of the shared key block cipher algorithm.

The load processing unit 103 has a function to, if the result of the verification by the load address verifying unit is success, decrypt and load a target program from the normal RAM 121 onto a specified address space (for example, the secure RAM 112). When the execution image verifying unit 102 verifies that any of a load-target program, a load address, and a load size has been tampered with, the load processing unit 103 performs an invalidation process so that a program loaded on the secure RAM 112 can not be executed. The invalidation process is achieved, for example, by invalidating the loaded program, or by invalidating the secure RAM 112 itself. To invalidate the secure RAM 112 itself, the bus is shut off to prevent an access from the CPU 111, for example.

The normal RAM 121, different from the secure RAM 112, is not provided with a secure mechanism. Onto the normal RAM 121, program code and data that need not be protected are loaded, as well as load-target objects.

The input/output unit 122 controls data input/output with various external devices connected to the data processing device 120. The devices connected to the data processing device 120 include, for example, storage mediums such as a memory card 140 and a hard disk drive (HDD) 141, a communication line 142, and a device such as a receiver 143 that has a data transmission/reception function. The input/output unit 122 receives (downloads) a load-target object, which is to be processed by the data processing device 120, from outside of the device and stores the received object in the normal RAM 121. A program for the load-target object stored in the normal RAM 121 is loaded onto the secure RAM 112 by the program loader 100 such that the processor 110 can execute the program in a protected execution environment.

<Address Map>

Figure 2:
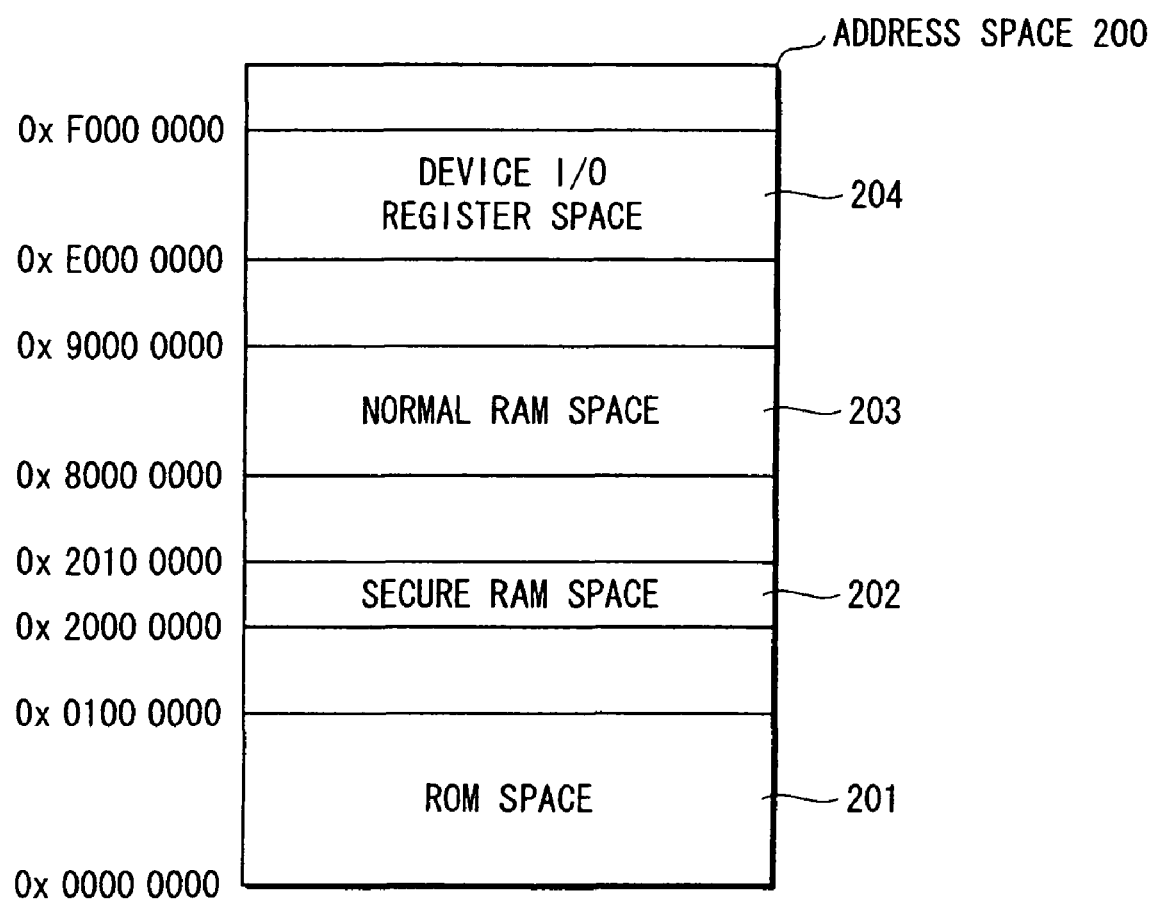
FIG. 2 shows an example of a memory space address map in Embodiment 1 of the present invention.

FIG. 2 shows an example of a memory space address map 200 viewed from the CPU 111. In this example, addresses 0x00000000-0x00FFFFFF are assigned to a ROM space 201, addresses 0x20000000-0x200FFFFF to a secure RAM space 202, addresses 0x80000000-0x8FFFFFFF to a normal RAM space 203, and addresses 0xE0000000-0xEFFFFFFF to an I/O register space 204 for various devices to be connected to the processor 110. In the program loader 100, the load address verifying unit 101 calculates a load address space from a load address 302 and a load size 303 which is a size of a program to be loaded, and verifies whether or not the calculated load address space is included in the secure RAM space 202. If the verification result is positive, the load processing unit 103 performs the loading of the program. With this construction, there is no risk that a program to be protected is loaded onto a normal RAM space that is not secure.

<Data Structure>

Figure 3:
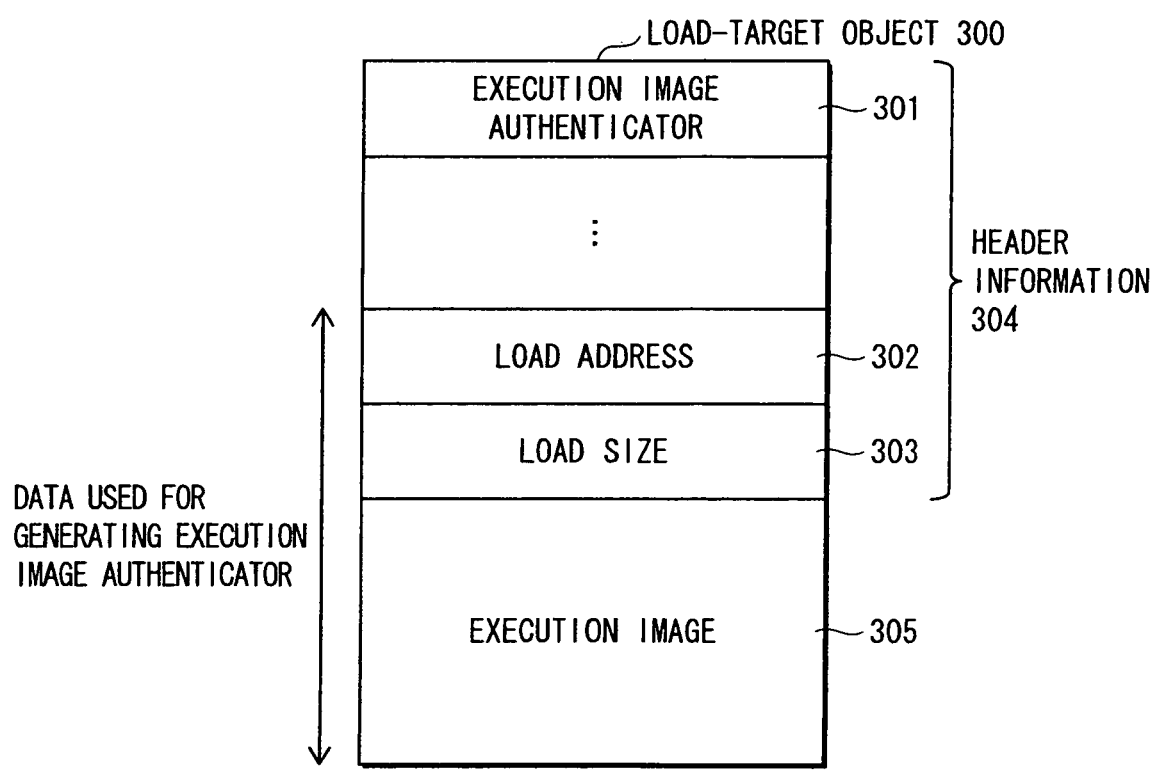
FIG. 3 shows an example of the format of a load-target object in Embodiment 1 of the present invention.

FIG. 3 shows an example of the format of a load-target object in the present embodiment.

A load-target object 300 is composed of header information 304 and an execution image 305.

The header information 304 includes an execution image authenticator 301, a load address 302, and a load size 303.

The execution image authenticator 301 is data that is used for authentication and is generated by applying a hash algorithm to data that includes at least the load address 302, the load size 303, and an execution image 305.

The execution image 305 is composed of program code and data. The execution image 305 is encrypted (hereinafter, the encrypted execution image 305 is referred to as an execution image 305a). It is preferable that when the execution image authenticator 301 is generated, the load address 302, the load size 303, and the execution image 305 are arranged consecutively as shown in FIG. 3. However, the arrangement of the load address 302, the load size 303, and the execution image 305 when the execution image authenticator 301 is generated is not limited to this, but may be different from this.

<Tampering Detection Method of Execution Image Verifying Unit 102>

Here will be described how the execution image verifying unit 102 verifies whether or not an execution image and a load address have been tampered with. The execution image verifying unit 102 generates a hash value in the same manner as when the execution image authenticator 301 is generated, with respect to data that includes the load address 302, the load size 303, and the execution image 305 loaded on the secure RAM 112. The execution image verifying unit 102 compares the generated hash value with the execution image authenticator 301 to verify the authenticity of the load address 302, the load size 303, and the execution image 305. If the generated hash value matches the execution image authenticator 301, the execution image verifying unit 102 verifies that the load address 302, the load size 303, and the execution image 305 are authentic. As described above, the execution image authenticator 301 is data used for authentication and is generated by applying a hash algorithm to data that includes at least the load address 302, the load size 303, and the execution image 305. As a result, if any of the load address 302, the load size 303, and the execution image 305 has been tampered with, the generated hash value should differ from the execution image authenticator 301. Accordingly, only one verification performance can detect whether or not any of the load address 302, the load size 303, and the execution image 305 has been tampered with.

<Process Flow>

Figure 4:
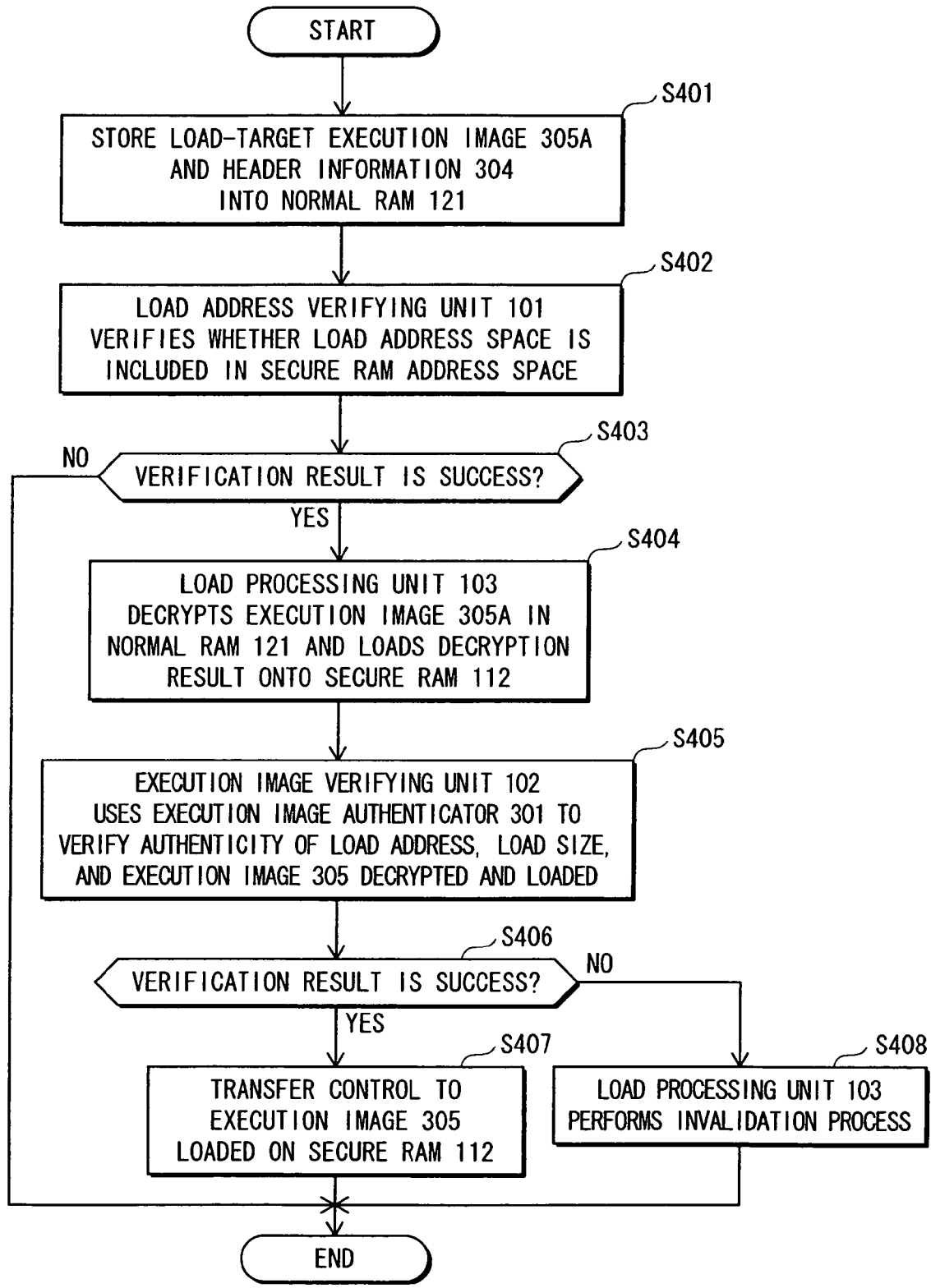
FIG. 4 is a flowchart showing the procedures of loading the execution image being a target of loading in Embodiment 1 of the present invention.

FIG. 4 is a flowchart showing the procedures of loading the execution image 305a, a target of loading, onto the secure RAM 112. First, the input/output unit 122 stores the execution image 305a and the header information 304 which constitute a load-target object, into the normal RAM 121 (step S401). The load address verifying unit 101 verifies whether or not a load address space, which is calculated from the load address 302 and the load size 303, is included in the secure RAM space (step S402). If the verification result is failure (No in step S403), the process ends without loading. If the verification result is success (Yes in step S403), the load processing unit 103 decrypts the execution image 305a having been stored in the normal RAM and loads the execution image 305, which is obtained as a result of the decryption, onto the secure RAM 112 (step S404). The execution image verifying unit 102 then generates a hash value in the same manner as when the execution image authenticator 301 is generated, with respect to data that includes the load address 302, the load size 303, and the execution image 305 loaded on the secure RAM 112, and compares the generated hash value with the execution image authenticator 301 to verify the authenticity of the execution image 305, load address 302, and load size 303 (step S405). If the verification result is failure (No in step S406), the load processing unit 103 performs the invalidation process so that the loaded execution image cannot be executed, and ends the loading process (step S408). If the verification result is success (Yes in step S406), the program loader 100 ends the loading process normally, and transfers the control to the loaded execution image 305 (step S407).

With the above-described construction of the present embodiment, it is possible to perform the verification of the authenticity of the execution image, as including the verification of the authenticity of the load address and the load size. This construction produces an advantageous effect of minimizing the cost for performing the verification of tampering.

Embodiment 2

Embodiment 2 verifies the authenticity of the load-target object in a different manner from Embodiment 1. The following describes the format of the load-target object, the method of detecting tampering performed by the execution image detecting unit, and the flowchart of the loading process, which are different from those in Embodiment 1.

<Data Structure>

Figure 5:
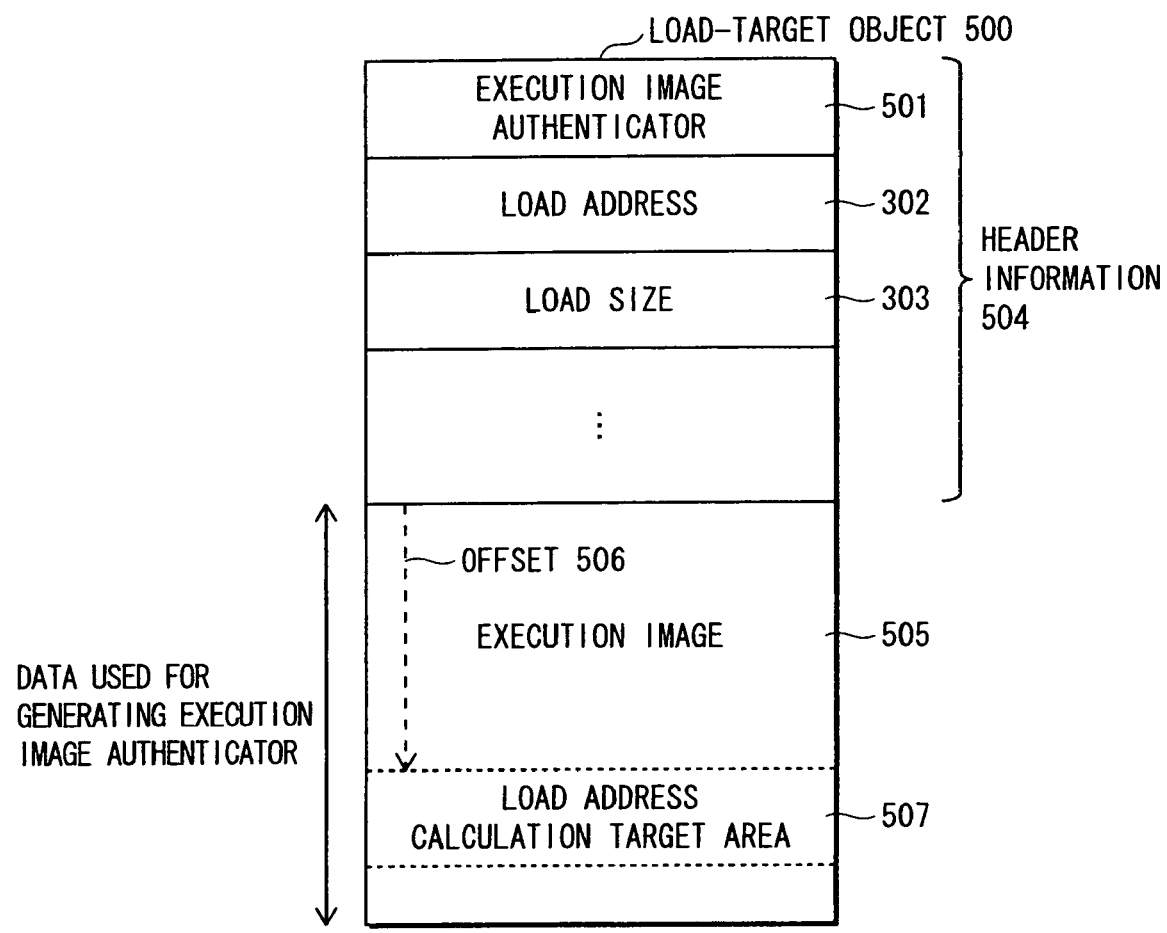
FIG. 5 shows an example of the format of a load-target object in Embodiment 2 of the present invention.

FIG. 5 shows an example of the format of a load-target object in the present embodiment.

A load-target object 500 is composed of header information 504 and an execution image 505.

The header information 504 includes at least an execution image authenticator 501, the load address 302, and the load size 303. There is no restriction on the arrangement order of the pieces of data that constitute the header information 504.

The execution image authenticator 501 is data that is used for authentication and is generated by applying a hash algorithm to data that includes the execution image 505.

The execution image 505 is composed of program code and data. After the execution image authenticator 501 is generated, the data stored in a load address calculation target area 507, which is a predetermined offset 506 away from the start of the execution image 505, is replaced with a predetermined value. Here, the predetermined value is obtained by performing a predetermined calculation using the data stored in the load address calculation target area 507 and the value of the load address 302. The predetermined calculation is a reversible operation, and is the exclusive OR in this example. The execution image 505 is encrypted after the above-described replacement process (hereinafter, the encrypted execution image 505 is referred to as an execution image 505a).

<Construction>

A program loader 100a of the present embodiment includes an execution image verifying unit 102a instead of the execution image verifying unit 102 of Embodiment 1. The execution image verifying unit 102a of the present embodiment, as is the case with the execution image verifying unit 102 of Embodiment 1, has a function to verify whether or not any of a load-target program and a load address has been tampered with. However, the execution image verifying unit 102*a* uses a different verification method from the execution image verifying unit 102. The execution image verifying unit 102*a* replaces the data at a position that is the predetermined offset 506 away from the start of the execution image 505 having been loaded on the secure RAM 112, with the predetermined value. Here, the predetermined value is obtained by performing a predetermined calculation using the data at the above-described position and the value of the load address 302. The predetermined calculation is a reversed calculation of the calculation that was explained with reference to FIG. 5, and is the exclusive OR in this example. In succession to this, the execution image verifying unit 102*a* generates a hash value in the same manner as when the execution image authenticator 501 is generated, with respect to the execution image 505 having been loaded on the secure RAM 112 and subjected to the above-described replacement process. The execution image verifying unit 102*a* compares the generated hash value with the execution image authenticator 501 to verify the authenticity.

In the execution image 505, the data stored in the load address calculation target area 507 has been replaced with a result that is obtained by performing a calculation using the data that was stored in the load address calculation target area 507 and the value of the load address 302. As a result, if any of the load address 302 and the execution image 505 has been tampered with, the generated hash value should differ from the execution image authenticator 501. Accordingly, only one verification performance on the execution image 505 can detect whether or not any of the load address 302 and the execution image 505 has been tampered with. That is to say, in the present embodiment, a correct execution image authenticator 501 is not obtained unless both the load address 302 and the execution image 505 used in the calculation are correct. Using this relationship, it is possible to detect tampering made on any of the load address 302 and the execution image 505. That is to say, without verifying the load address 302 itself, it is possible to verify whether the load address 302 has been tampered with.

<Process Flow>

Figure 6:
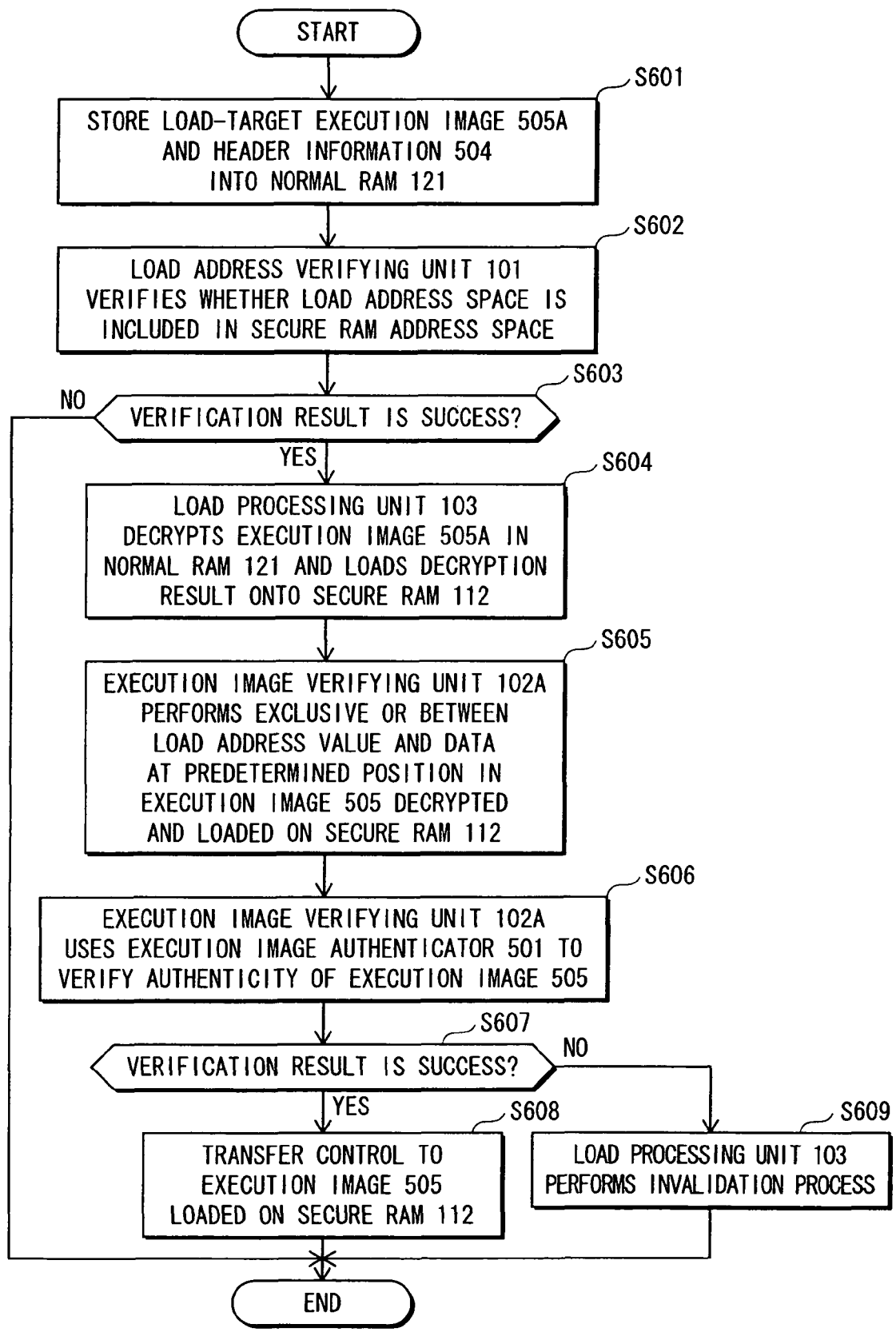
FIG. 6 is a flowchart showing the procedures of loading the execution image being a target of loading in Embodiment 2 of the present invention.

FIG. 6 is a flowchart showing the procedures of loading the execution image 505*a*, a target of loading, onto the secure RAM 112. First, the input/output unit 122 stores the execution image 505*a* and the header information 504 which constitute a load-target object, into the normal RAM 121 (step S601). The load address verifying unit 101 verifies whether or not a load address space, which is calculated from the load address 302 and the load size 303, is included in the address space of the secure RAM 112 (step S602). If the verification result is failure (No in step S603), the process ends without loading. If the verification result is success (Yes in step S603), the load processing unit 103 decrypts the execution image 505*a* having been stored in the normal RAM 121 and loads the execution image 505, which is obtained as a result of the decryption, onto the secure RAM 112 (step S604). The execution image verifying unit 102*a* then performs the exclusive OR between the value of the load address 302 and the data at a position that is the predetermined offset 506 away from the start of the execution image 505 having been loaded on the secure RAM 112, and replaces the data at the position that is the predetermined offset 506 away from the start of the execution image 505, with the result of the exclusive OR calculation (step S605). The execution image verifying unit 102*a* then generates a hash value in the same manner as when the execution image authenticator 501 is generated, with respect to the execution image 505 having been loaded on the secure RAM 112 and subjected to the above-described replacement process, and compares the generated hash value with the execution image authenticator 501 to verify the authenticity (step S606). If the verification result is failure (No in step S607), the load processing unit 103 performs the invalidation process so that the loaded execution image cannot be executed (step S609). If the verification result is success (Yes in step S607), the program loader 100*a* ends the loading process normally, and transfers the control to the loaded execution image 505 (step S608).

<Generating Load-Target Object>

Figure 7:
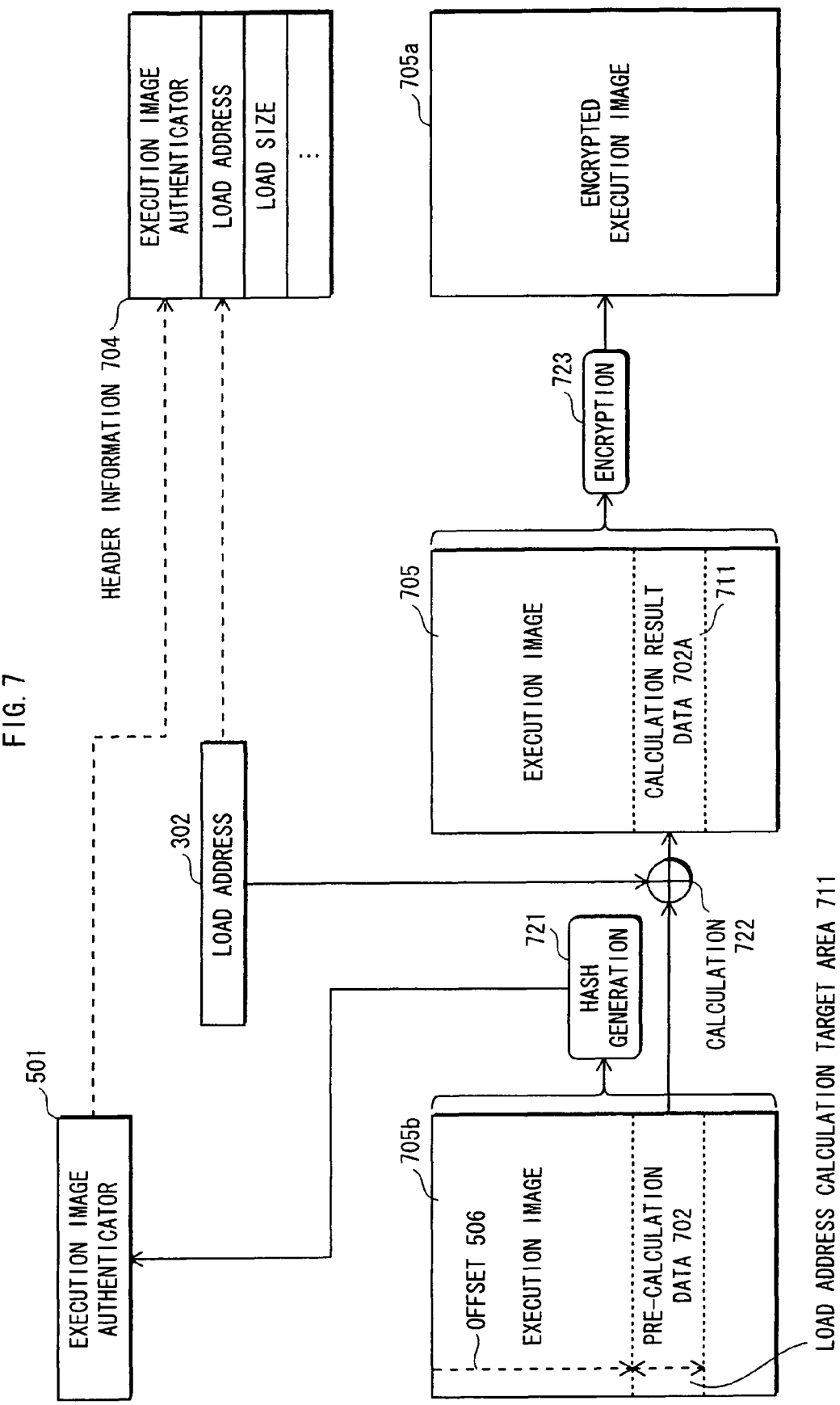
FIG. 7 illustrates how a load-target object is generated in Embodiment 2 of the present invention.

FIG. 7 illustrates how a load-target object is generated in the present embodiment. First, a hash value is obtained by performing a hash generation process 721 on an execution image 705*b*. The obtained hash value is referred to as an execution image authenticator 501. Next, a calculation 722 is performed using the value of the load address 302 and the data 702 stored in a load address calculation target area 711, which is the offset 506 away from the start of an execution image 705. The data 702 stored in the load address calculation target area 711 is replaced with the calculation result (calculation result data 702*a*). Here, the calculation 722 is a reversible operation such as the exclusive OR or addition (or subtraction). The calculation 722 may be a more complicate algorithm. Then, after the replacement, the execution image 705 is subjected to an encryption process 723 to obtain an encrypted execution image 705*a*. Lastly, a load-target object is obtained by combining the encrypted execution image 705*a* with header information 704 that includes at least the execution image authenticator 501, the load address 302, and the load size.

<Verification on Authenticity of Load-Target Object>

Figure 8:
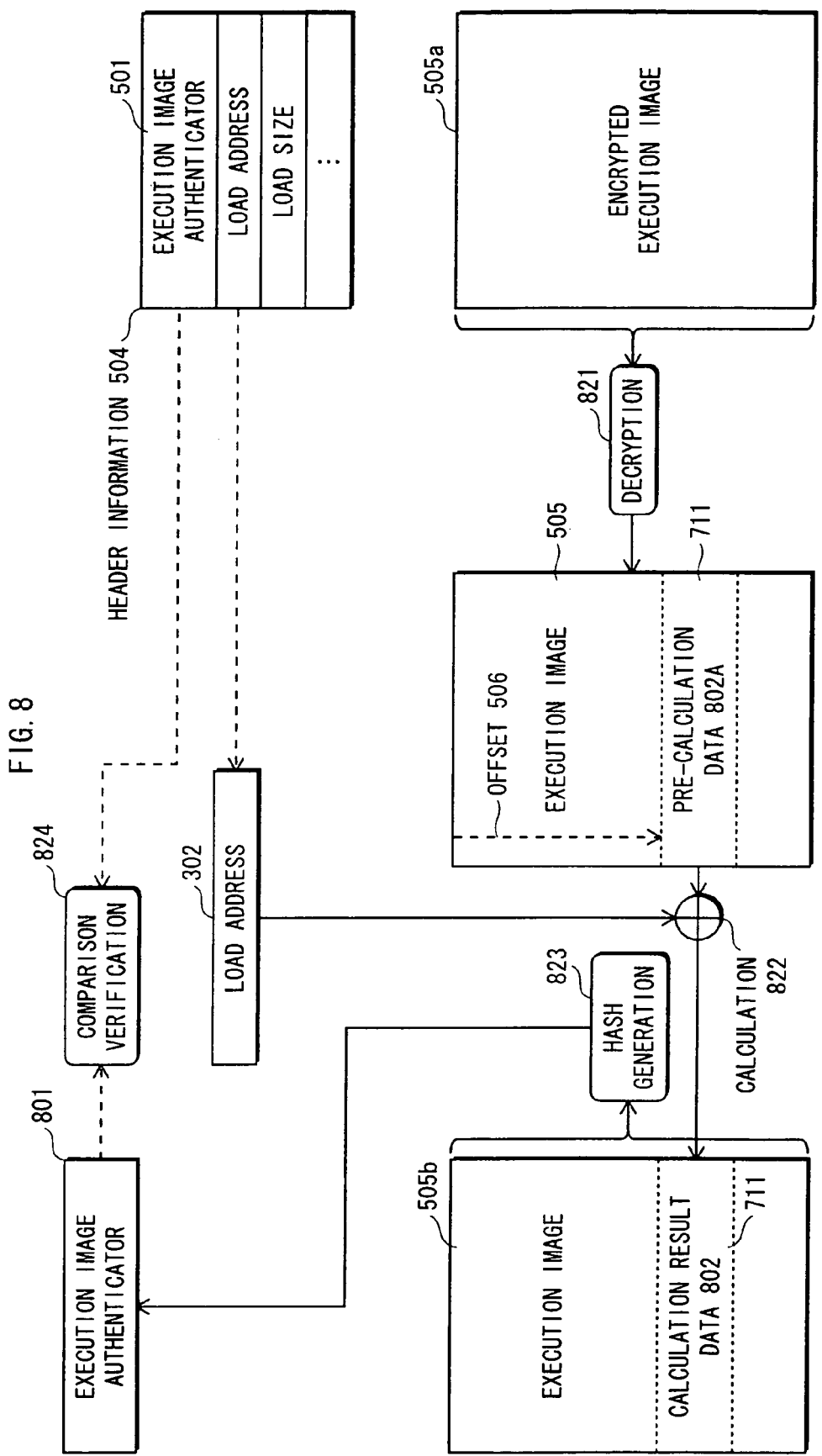
FIG. 8 illustrates how a verification on the authenticity of the load-target object is performed in Embodiment 2 of the present invention.

FIG. 8 illustrates how a verification on the authenticity of the load-target object is performed in the present embodiment. First, a decryption 821 is performed on the encrypted execution image 505*a* to obtain the execution image 505. Next, a calculation 822 is performed using the value of the load address 302 and the data 802*a* stored in a load address calculation target area 711, which is the offset 506 away from the start of the execution image 505. The data 802*a* stored in the load address calculation target area 711 is replaced with the calculation result (calculation result data 802). Here, the calculation 822 is a reversed calculation of the calculation 722, and is the exclusive OR if the calculation 722 is the exclusive OR, and is the subtraction if the calculation 722 is the addition. Then, after the replacement, the execution image 505*b* is subjected to a hash generation process 823 to obtain a hash value. The obtained hash value is referred to as an execution image authenticator 801. The obtained execution image authenticator 801 is compared with the execution image authenticator 501 that is contained in the header information 504. If the execution image authenticators match, the load address 302 and the execution image are judged to be authentic.

With the above-described construction of the present embodiment, it is possible to perform the verification of the authenticity of the execution image, as including the verification of the authenticity of the load address. This construction produces an advantageous effect of minimizing the cost for performing the verification of tampering. Also, the construction of the present embodiment makes it difficult for a malicious third party to generate a load-target object that can be loaded correctly, by keeping in secret the offset value and the calculation to be performed on the data stored in the load address calculation target area. This is another advantageous effect produced by the above-described construction of the present embodiment.

That is to say, if a malicious third party knows the format of the load-target object, the third party may carry out an attack in which it extracts only the execution image 505a from the load-target object, and attempts to cause an unauthentic device, which does not include the load address verifying unit, to run the execution image 505a. However, according to the present embodiment, it is impossible to restore the execution image 505a to the state in which it can run correctly unless the load address verifying unit performs a calculation on the data stored in the load address calculation target area using a correct value of the load address 302. As a result, even if the malicious third party carries out the above-described attack, the other device cannot run the load-target object correctly.

Embodiment 3

In Embodiment 3, the load address restore information contained in the header information constituting the load-target object is used to restore a load address that has been tampered with.

<Construction>

Figure 9:
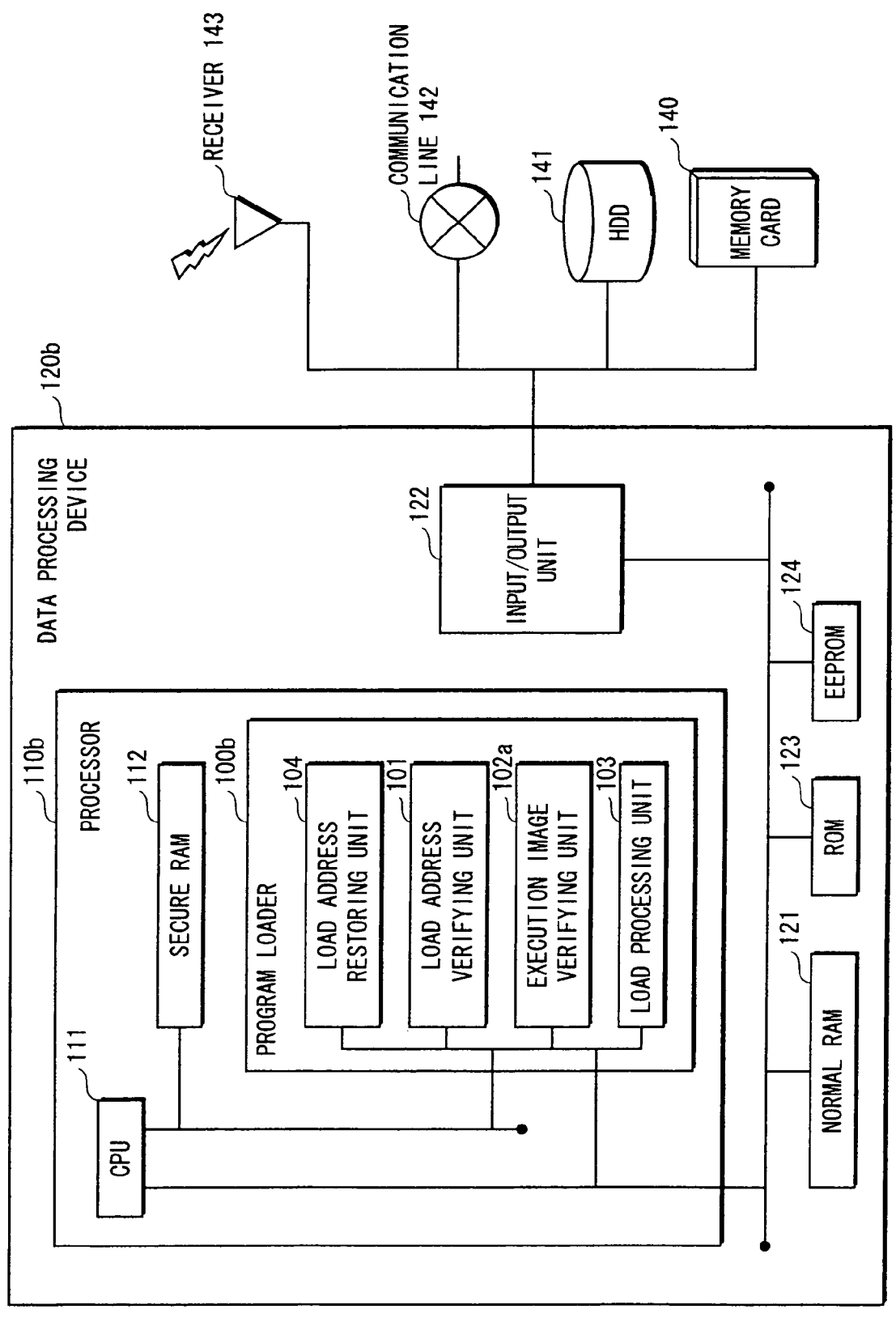
FIG. 9 shows the construction of a program loader, a processor, and a data processing device in Embodiment 3 of the present invention.

FIG. 9 shows a program loader 100b of Embodiment 3, a processor 110b that includes the program loader 100b, and a data processing device 120b that includes the processor 110b.

The program loader 100b includes the load address verifying unit 101, an execution image verifying unit 102a, the load processing unit 103, and a load address restoring unit 104. FIG. 9 differs from FIG. 1 in that the program loader 100b includes the load address restoring unit 104 and that the program loader 100b includes the execution image verifying unit 102a instead of the execution image verifying unit 102.

The load address restoring unit 104 has a function to, if a load address contained in a load-target object has been tampered with, re-calculate the load address correctly.

The program loader 100b loads an execution image of a load-target object stored in the normal RAM 121, onto the secure RAM 112 in a reliable manner using the above-described functions of the load address verifying unit 101, the execution image verifying unit 102a, the load processing unit 103, and the load address restoring unit 104. Also, if a load address of a load-target object has been tampered with, the program loader 100b restores the tampered load address to its original state, enabling an execution image to be safely loaded onto a space at the restored load address.

<Data Structure>

Figure 10:
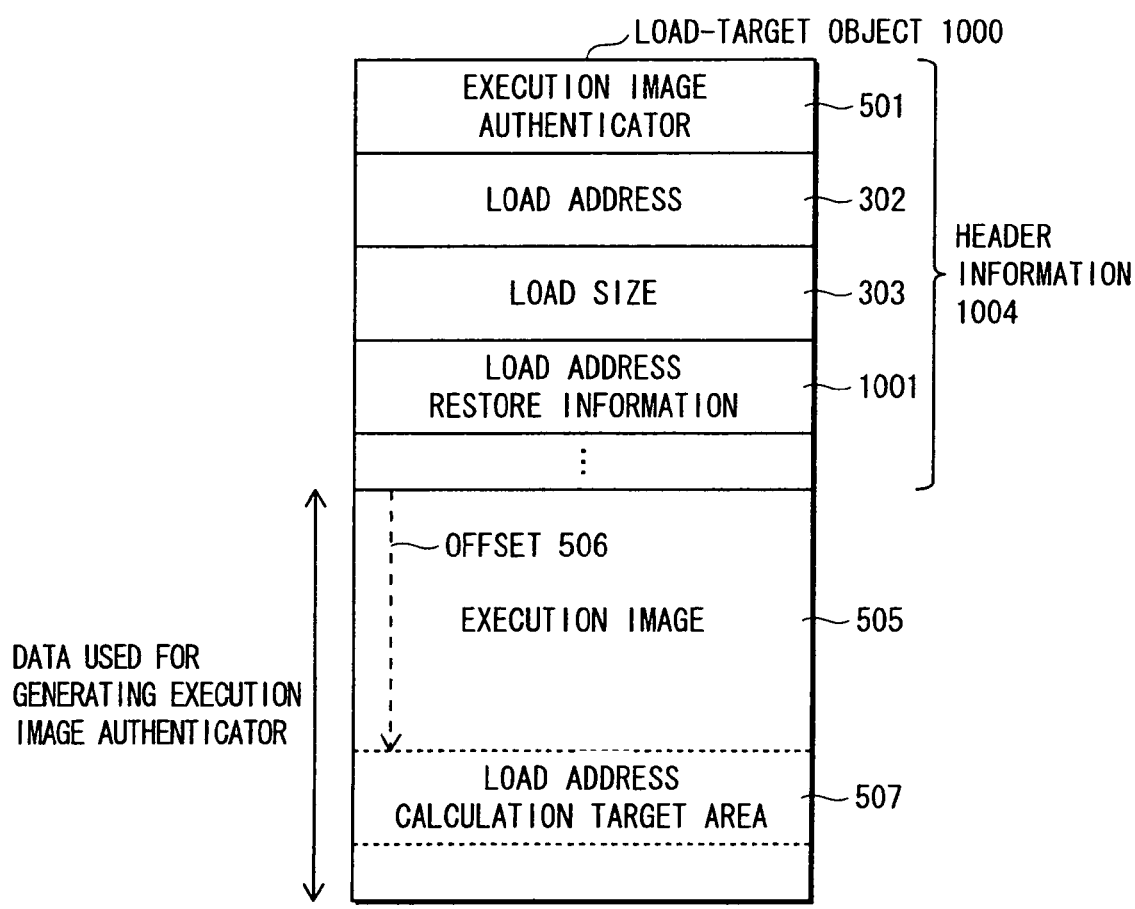
FIG. 10 shows an example of the format of a load-target object in Embodiment 3 of the present invention.

FIG. 10 shows an example of the format of a load-target object in the present embodiment. A load-target object 1000 is composed of header information 1004 and the execution image 505. The header information 1004 includes the execution image authenticator 501, the load address 302, the load size 303, and load address restore information 1001.

The load address restore information 1001 is used to restore a load address that has been tampered with.

FIG. 10 only differs from FIG. 5 in that the header information 1004 includes the load address restore information 1001.

<Process Flow>

Figure 11:
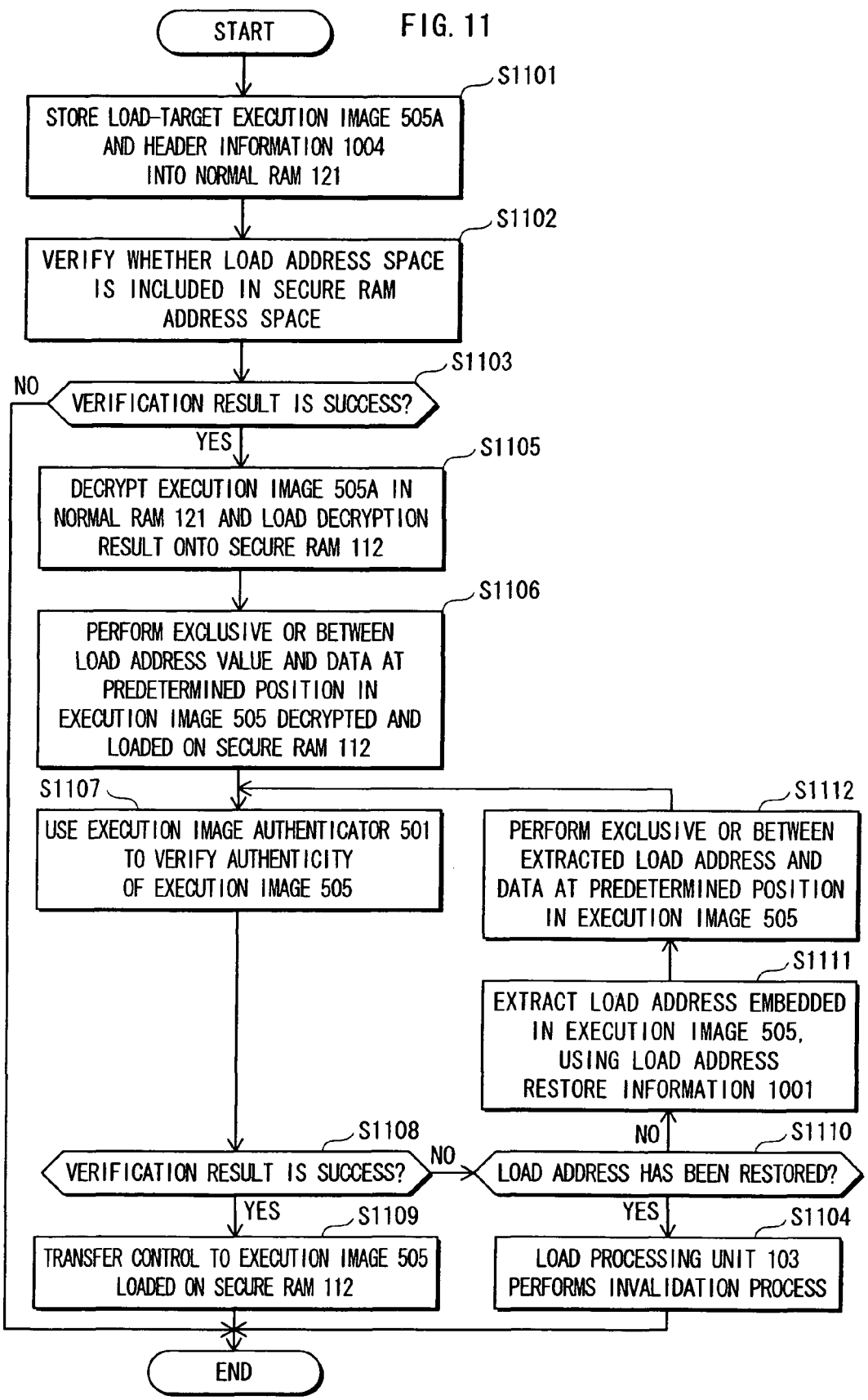
FIG. 11 is a flowchart showing the procedures of loading the execution image being a target of loading in Embodiment 3 of the present invention.

FIG. 11 is a flowchart showing the procedures of loading the execution image 505a, a target of loading, onto the secure RAM 112. First, the execution image 505a and the header information 1004 which constitute a load-target object are stored into the normal RAM 121 (step S110). The load address verifying unit 101 verifies whether or not the load address space is included in the address space of the secure RAM 112 (step S1102). If the verification result is failure (No in step S1103), the process ends without loading (step S1104). If the verification result is success (Yes in step S603), the load processing unit 103 decrypts the execution image 505a having been stored in the normal RAM 121 and loads the execution image 505, which is obtained as a result of the decryption, onto the secure RAM 112 (step S1105). The execution image verifying unit 102a then performs the exclusive OR between the value of the load address 302 and the data at a position that is the predetermined offset 506 away from the start of the execution image 505 having been loaded on the secure RAM 112, and replaces the data at the position that is the predetermined offset 506 away from the start of the execution image 505, with the result of the exclusive OR calculation (step S1106). The execution image verifying unit 102a then generates a hash value in the same manner as when the execution image authenticator 501 is generated, with respect to the execution image 505 having been loaded on the secure RAM 112 and subjected to the above-described replacement process, and compares the generated hash value with the execution image authenticator 501 to verify the authenticity (step S1107). If the verification result is success (Yes in step S1108), the program loader 100b ends the loading process normally, and transfers the control to the loaded execution image 505 (step S1109). If the verification result is failure (No in step S1108), it is judged whether or not the load address has been restored (step S1110). If it is judged that the load address has been restored (Yes in step S1110), the load processing unit 103 performs a process so that the loaded execution image cannot be executed, and ends the loading process (step S1104) If it is judged that the load address has not been restored (No in step S1110), the load address restoring unit 104 extracts a load address embedded in the execution image 505, using the load address restore information 1001 (step S1111). The load address restoring unit 104 then performs the exclusive OR between the extracted load address and the data at a position that is the predetermined offset 506 away from the start of the execution image 505, and replaces the data at the position that is the predetermined offset 506 away from the start of the execution image 505, with the result of the exclusive OR calculation (step S1112). After this step, the execution image verifying unit 102a verifies again the authenticity of the execution image 505 using the execution image authenticator 501 (step S1107).

In step S1106 described above, the exclusive OR is performed for the replacement of the data. However, not limited to this, any calculation may be performed in so far as it is a reversed calculation of the calculation that was explained with reference to FIG. 5, as is the case with Embodiment 2.

Also, the calculation performed in step S1112 is not limited to the exclusive OR, but may be any calculation in so far as it is a reversed calculation of a calculation that will be explained with reference to FIG. 12 later.

<Generating Load-Target Object>

Figure 12:
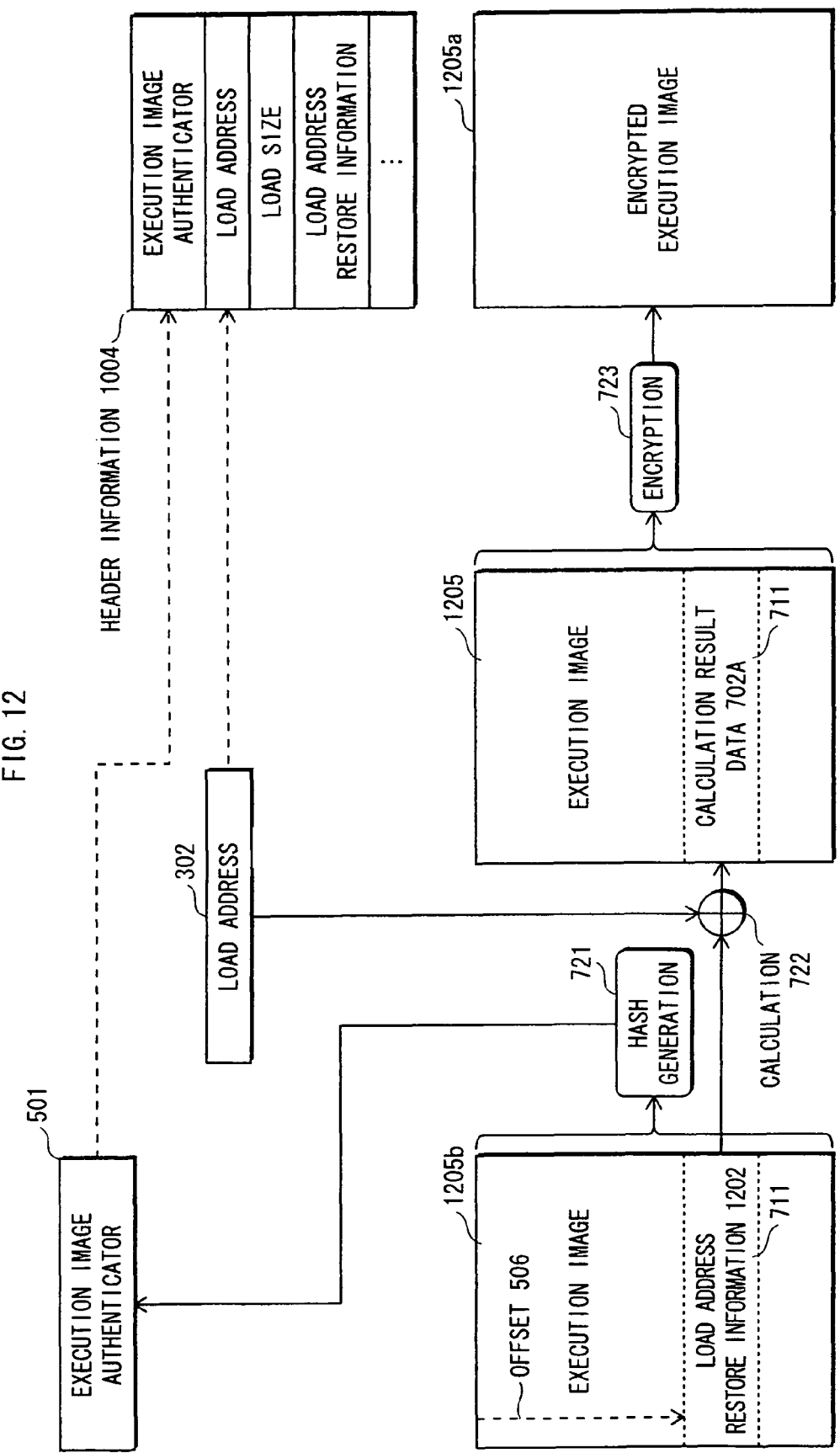
FIG. 12 illustrates how a load-target object is generated in Embodiment 3 of the present invention.

FIG. 12 illustrates how a load-target object is generated in the present embodiment. First, a hash value is obtained by performing a hash generation process 721 on an execution image 1205b. The obtained hash value is referred to as the execution image authenticator 501. Next, the calculation 722 is performed using the value of the load address 302 and load address restore information 1202 stored in the load address calculation target area 711, which is the offset 506 away from the start of an execution image 1205b. The data 1202 stored in the load address calculation target area 711 is replaced with the calculation result (calculation result data 702a). In the present embodiment, the load address restore information is data (1202) stored in the load address calculation target area 711. Here, the calculation 722 is a reversible operation, and is the exclusive OR in this example. The calculation 722 may be a more complicate algorithm. Then, after the replacement, the execution image 1205 is subjected to an encryption process 723 to obtain an encrypted execution image 1205a. Lastly, a load-target object is obtained by combining the encrypted execution image 1205a with header information 1004 that includes at least the execution image authenticator 501, the load address 302, the load size, and the load address restore information.

<Verification on Authenticity of Load-Target Object>

Figure 13:
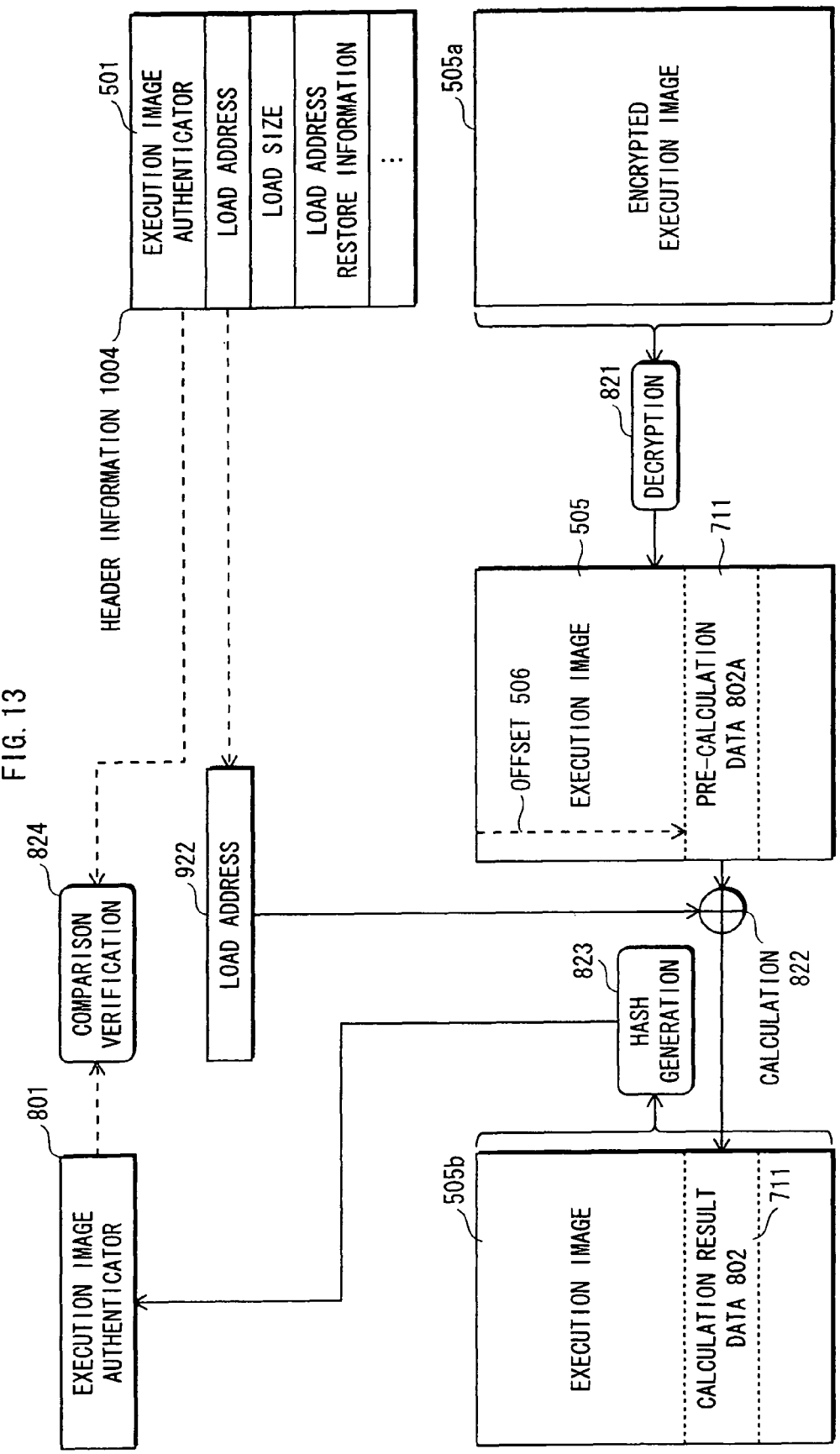
FIG. 13 illustrates how a verification on the authenticity of the load-target object is performed in Embodiment 3 of the present invention.

FIG. 13 illustrates how a verification on the authenticity of the load-target object is performed in the present embodiment. FIG. 13 only differs from FIG. 8 in that the header information 1004 includes the load address restore information. If it is judged that the execution image authenticator 801 is authentic, the calculation result data 802 matches the load address restore information.

Figure 14:
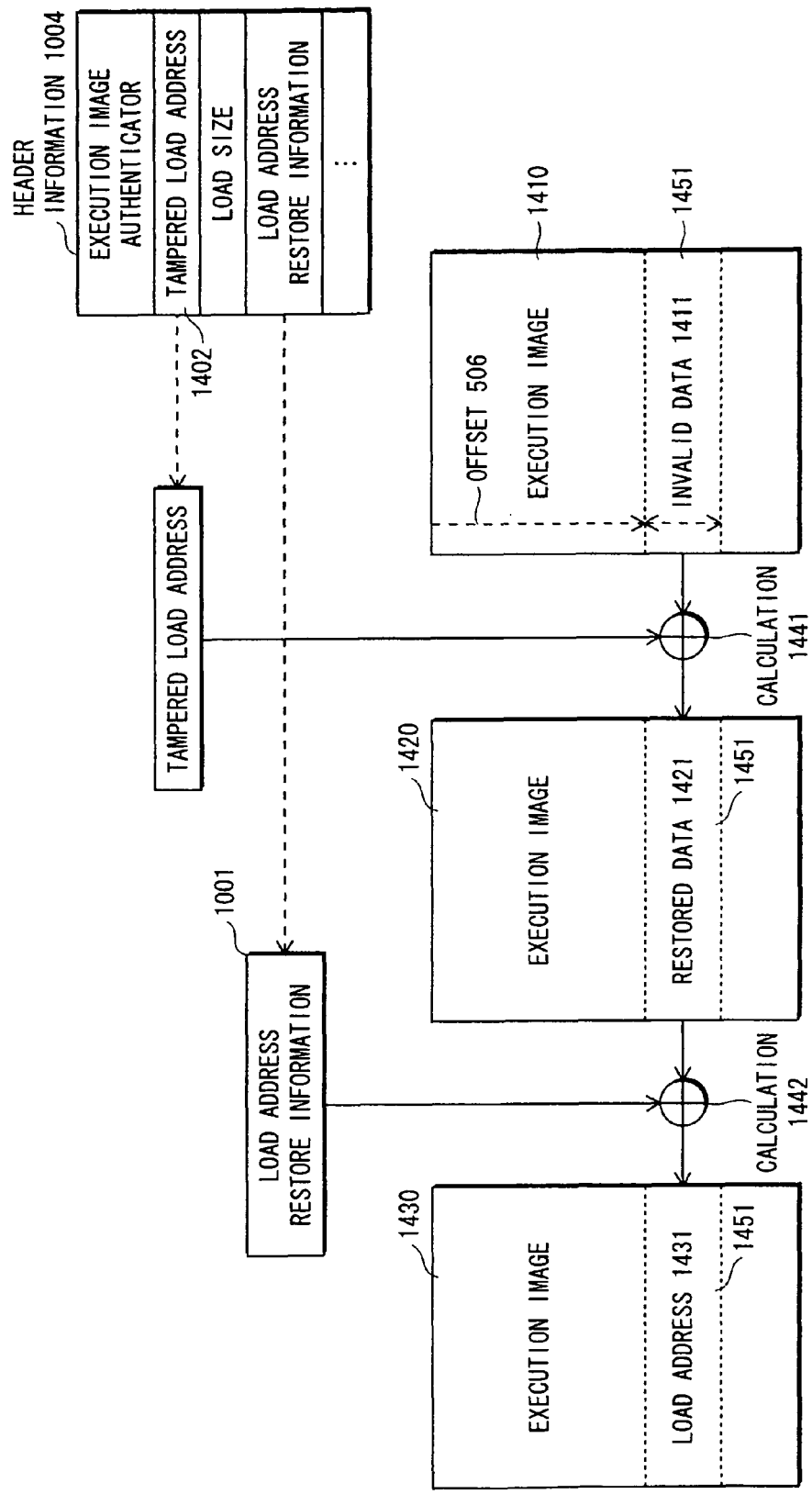
FIG. 14 shows a phase transition in the process of restoring the load address of the load-target object, in Embodiment 3 of the present invention.

FIG. 14 shows a flow of procedures that are performed when the execution image is judged not to be authentic in the authenticity verification process shown in FIG. 13. If a tampered load address 1402 is used in the authenticity verification process, invalid data 1411 is stored in the space at a position that is the predetermined offset 506 away from the start of an execution image 1410. The invalid data 1411 is generated as the calculation result data 802 when the calculation 822 is performed using the tampered load address. A correct execution image or load address cannot be obtained if the invalid data 1411 is used in the succeeding processes. Therefore, to perform the succeeding processes, it is necessary to restore the data to be stored in the load address calculation target area, eliminating the effect of the calculation 822 that was performed using the tampered load address. The data to be stored in a load address calculation target area can be restored by performing a reversed calculation of the calculation 822 using the invalid data 1411 and the tampered load address 1402. That is to say, by performing a calculation 1441 using the invalid data 1411 and the tampered load address 1402, the invalid data 1411 in the load address calculation target area 1451 is replaced with the restored data 1421 (it is the same as the data stored in the load address calculation target area 711). A calculation 1442 being a reversible operation is performed using the load address restore information 1001 and the restored data 1421 in an execution image 1420. And then a load address 1431, which is equivalent with a load address that was embedded when the load-target object was generated, is extracted from an execution image 1430. A calculation being a reversible operation is performed using the extracted load address 1431 and the data at a position that is the predetermined offset 506 away from the start of the execution image 505, and the data at a position that is the predetermined offset 506 away from the start of the execution image 505 is replaced with the result of this calculation. The execution image after this replacement is subjected to the authenticity verification process.

According to the present embodiment, after a tampering of a load address is detected, it is possible to extract a load address that has been embedded in an execution image, using the load address restore information, and to restore the data stored in the load address calculation target area of the execution image, using the extracted load address. When the result of a re-verification of the execution image is success, the re-loading process can be simplified, resulting in the improvement in the efficiency of the loading process. Also, according to the present embodiment, a calculation being a reversible operation may be performed using a fixed value stored in the program loader and an execution image, and the result of the calculation may be used as the load address restore information. This eliminates the need to use the data in the execution image as it is, as the header information, which improves the safety.

<Modification 1>
<Construction>

The program loader 100 includes a load address verifying unit 101c, the execution image verifying unit 102c, and the load processing unit 103.

The load address verifying unit 101c has, in addition to the function of the load address verifying unit 101, a function to verify whether or not a load address has been tampered with. These functions are provided to prevent the case where a program with a high security level is transferred to a RAM other than the secure RAM 112 due to an erroneous specification of a load address or due to a malicious tampering of a load address.

The execution image verifying unit 102c has a function to verify whether or not a load-target object has been tampered with. With this function, it is possible to prevent a program, which is to perform an unauthorized process, from being loaded onto the secure RAM 112 and executed.

Figure 15:
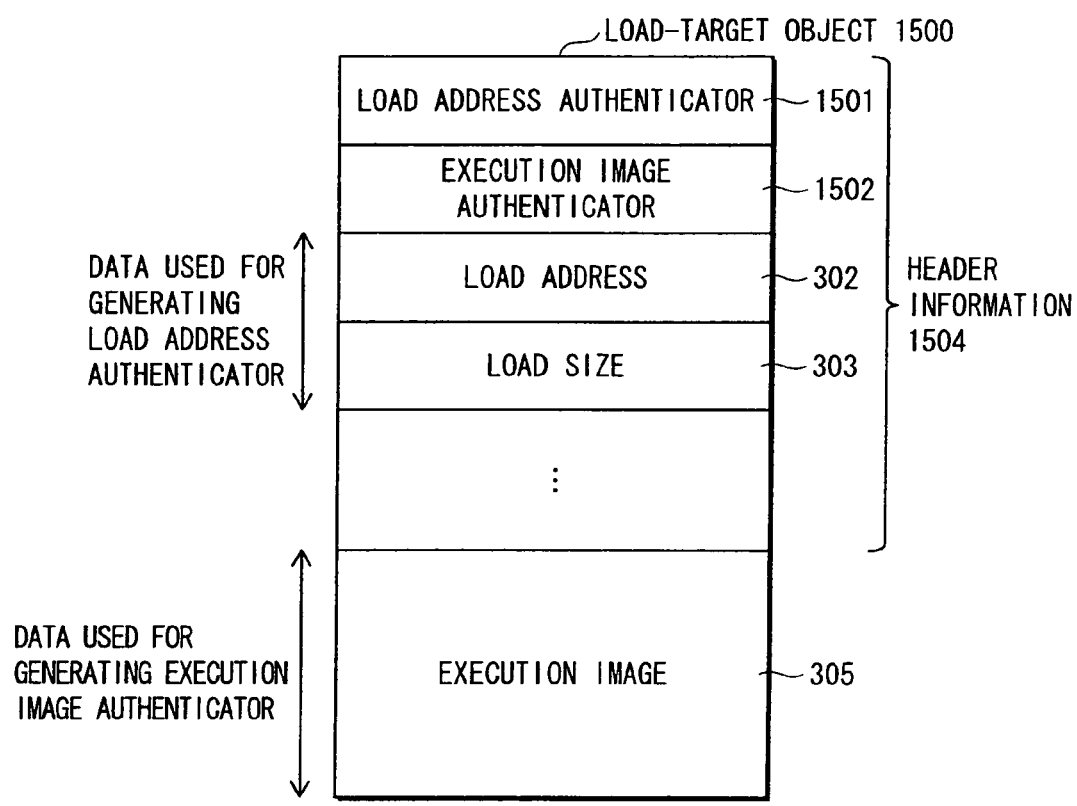
FIG. 15 shows an example of the format of a load-target object in Modification 1 of the present invention.

FIG. 15 shows an example of the format of a load-target object 1500. Header information 1504 includes at least a load address authenticator 1501, an execution image authenticator 1502, the load address 302, and the load size 303.

The load address authenticator 1501 is data that is used for authentication and is generated by applying a hash algorithm to data that includes at least the load address 302 and the load size 303.

The execution image authenticator 1502 is data that is used for authentication and is generated by applying a hash algorithm to the execution image 305 that is composed of program code and data.

There is no restriction on the arrangement order of the pieces of data that constitute the header information 1504.

The execution image 305 may be encrypted data.

Figure 16:
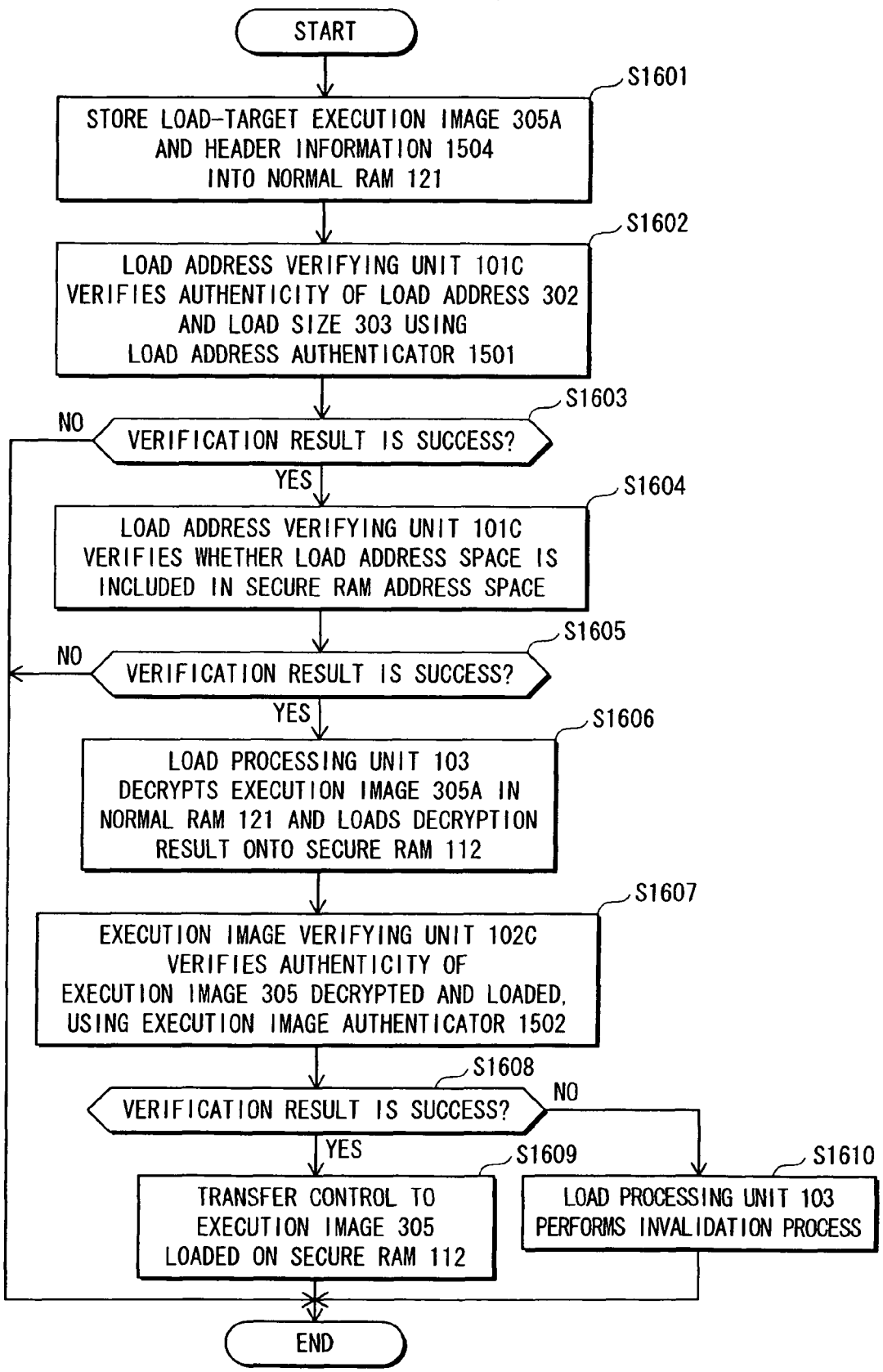
FIG. 16 is a flowchart showing the procedures of loading the execution image being a target of loading in Modification 1 of the present invention.

FIG. 16 is a flowchart showing the procedures of loading the execution image 305a, a target of loading, onto the secure RAM 112. First, the execution image 305a and the header information 1504 which constitute a load-target object are stored into the normal RAM 121 (step S1601). The load address verifying unit 101c generates a hash value in the same manner as when the load address authenticator 1501 is generated, with respect to the load address 302 and the load size 303, compares the generated hash value with the load address authenticator 1501 to verify the authenticity (step S1602). If the verification result is failure (No in step S1603), it is judged that any of the load address 302 and the load size 303 has been tampered with, and the process ends without loading. If the verification result is success (Yes in step S1603), the load address verifying unit 101c verifies whether or not a load address space, which is calculated from the load address 302 and the load size 303, is included in the secure RAM space (step S1604). If the verification result is failure (No in step S1605), the process ends without loading. If the verification result is success (Yes in step S1605), the load processing unit 103 decrypts the execution image 305a and loads the decryption result onto the secure RAM 112 (step S1606). The execution image verifying unit 102c then generates a hash value in the same manner as when the execution image authenticator 1502 is generated, with respect to the execution image 305 loaded on the secure RAM 112, and compares the generated hash value with the execution image authenticator 1502 to verify the authenticity (step S1607). If the verification result is failure (No in step S1608), the load processing unit 103 performs the invalidation process so that the loaded execution image cannot be executed, and ends the loading process (step S1610). If the verification result is success (Yes in step S1608), the program loader 100c ends the loading process normally, and transfers the control to the loaded execution image 305 (step S1609).

<Modification 2>

Figure 17:
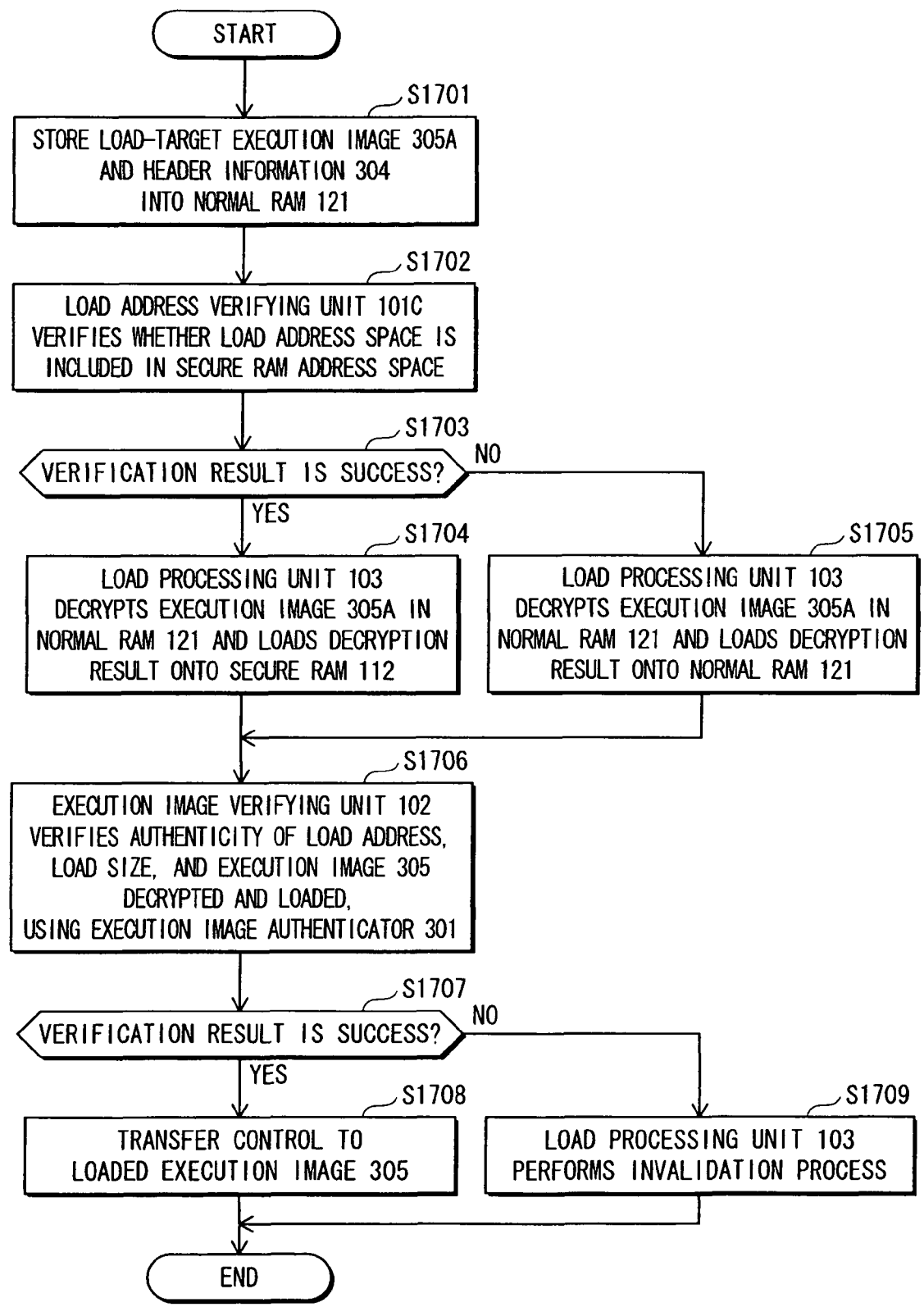
FIG. 17 is a flowchart showing the procedures of loading the execution image being a target of loading in Modification 2 of the present invention.

In the above-described embodiments, the load address verifying unit 101 ends the process without loading if it is verified that the load address space is not included in the secure RAM space. This is because it is presumed that the load-target program is a program to be protected. In the present modification, when the load address space is not included in the secure RAM space, it is judged whether the load-target program is a program that is not a target of protection and need not be stored in the secure RAM space, or the load-target program that became to be stored in the normal RAM space because the program has been tampered with by a malicious party. FIG. 17 is a flowchart showing the procedures of loading an execution image, a target of loading. Steps S1701 and S1702 are the same as steps S401 and S402 in FIG. 4. In step S1703, it is judge whether or not the verification result is success. If the verification result is failure (No in step S1703), the control moves to step S1705 in which the load processing unit 103 decrypts the execution image 305a having been stored in the normal RAM and loads the execution image 305, which is obtained as a result of the decryption, onto the normal RAM. At this stage in the loading process, the judgment on whether or not the verification result is success is made on the presumption that the execution image 305a should be protected and be loaded onto the secure RAM 112. As a result, the negative result of the above judgment indicates one of the two cases: (i) the execution image 305a is loaded onto the normal RAM 121 because there was tampering; and (ii) the execution image 305a is loaded onto the normal RAM 121 because it is to be loaded onto the normal RAM 121 in the first place because it is not a target of protection. In step S1706, the same verification process is performed as in step S405, with respect to the execution image 305 that has been loaded onto either the secure RAM 112 or the normal RAM 121. If the verification result is success (Yes in step S1707), the program loader ends the loading process normally, and transfers the control to the loaded execution image 305 (step S1708). If the verification result is failure (No in step S1707), the load processing unit performs a process so that the loaded execution image cannot be executed, and ends the loading process (step S1709). As described above, since steps S1708 and S1707 are performed in the same manner as steps S405 and S406, the negative result of the verification performed in these steps indicates that the load address or the load size has been tampered with.

In the above-described procedures, if the results of the verifications performed in steps S1703 and step S1707 are both NO (failure), it can be judged that the execution image is loaded onto the normal RAM while the load address or the like is tampered. On the other hand, if the result of the verification performed in step S1703 is NO (failure) and the result of the verification performed in step S1707 YES (success), it can be judged that the execution image 305a is loaded onto the normal RAM as originally intended because it is not a target of protection and need not be stored in the secure RAM, and that the load address or the like has not been tampered with.

With the above-described construction of this modification, it is possible to distinguish between two cases: (i) the program is loaded onto the normal memory because it is not a target of protection and not to be loaded onto the secure RAM; and (ii) the program is loaded onto the normal memory because there was tampering by a malicious party, and it is possible to prevent the program in the case (ii) here from being loaded onto the memory. The program, which is not a target of protection, is stored in the normal RAM, is subjected to the verification on the authenticity, and if it is judged to be authentic, the program is executed by the CPU 111. Having been described here is a modification to FIG. 4 of Embodiment 1. However, this can also be applied to FIGS. 6, 11, and 16.

<Modification 3>

In Embodiments 2 and 3, a predetermined calculation is performed using the load address and the data stored in the load address calculation target area of the decrypted execution image. However, not limited to this, a predetermined calculation may be performed using the load address and the data stored in the load address calculation target area of the encrypted execution image. In this case, the verification of the load address calculation target area is performed before the decryption of the execution image.

With this construction, it is possible to judge before the decryption of the execution image whether or not a tampering has been made. This makes it possible to detect a tampering of an execution image at an earlier stage.

<Modification 4>

In Embodiments 2 and 3, a hash generation process is performed after the data stored in the load address calculation target area 507 is restored. However, these operations may be performed in the reversed order.

In this case, the execution image authenticator is a hash value corresponding to an execution image in which the load address calculation target area 711 includes calculation result data, a result of calculation performed using the data stored in the area 711.

<Modification 5>

In Embodiments 1 to 3, it is confirmed whether or not the load address is included in a secure area. However, not limited to this, it may be confirmed whether or not the load address is included in a normal area.

With this construction, it is possible to prevent an attack that, for example, tries to cause a normal program, which has been tampered with to output data from the secure area to outside, to be read into the secure area.

<Modification 6>

The present invention also includes a device for executing a characterizing step in a method for creating the above-described program.

<Modification 7>

In Embodiments 2 and 3, a load address is used in the calculation using the data stored in the load address calculation target area. However, not limited to this, a load size may be used in the calculation using the data stored in the load address calculation target area. This enables both the load size and the execution image to be verified at one time.

Alternatively, both a load address and a load size may be used in the calculation using the data stored in the load address calculation target area. This makes it possible to verify whether or not any of the load address, load size, and execution image has been tampered with, at one time.

<Modification 8>

In Embodiment 1 described above, first the load processing unit 103 loads the execution image onto the secure RAM, then the execution image verifying unit 102 verifies the authenticity of the loaded execution image using the execution image authenticator 301. In the present modification, the authenticity is verified before the execution image is loaded onto the secure RAM.

Figure 18:
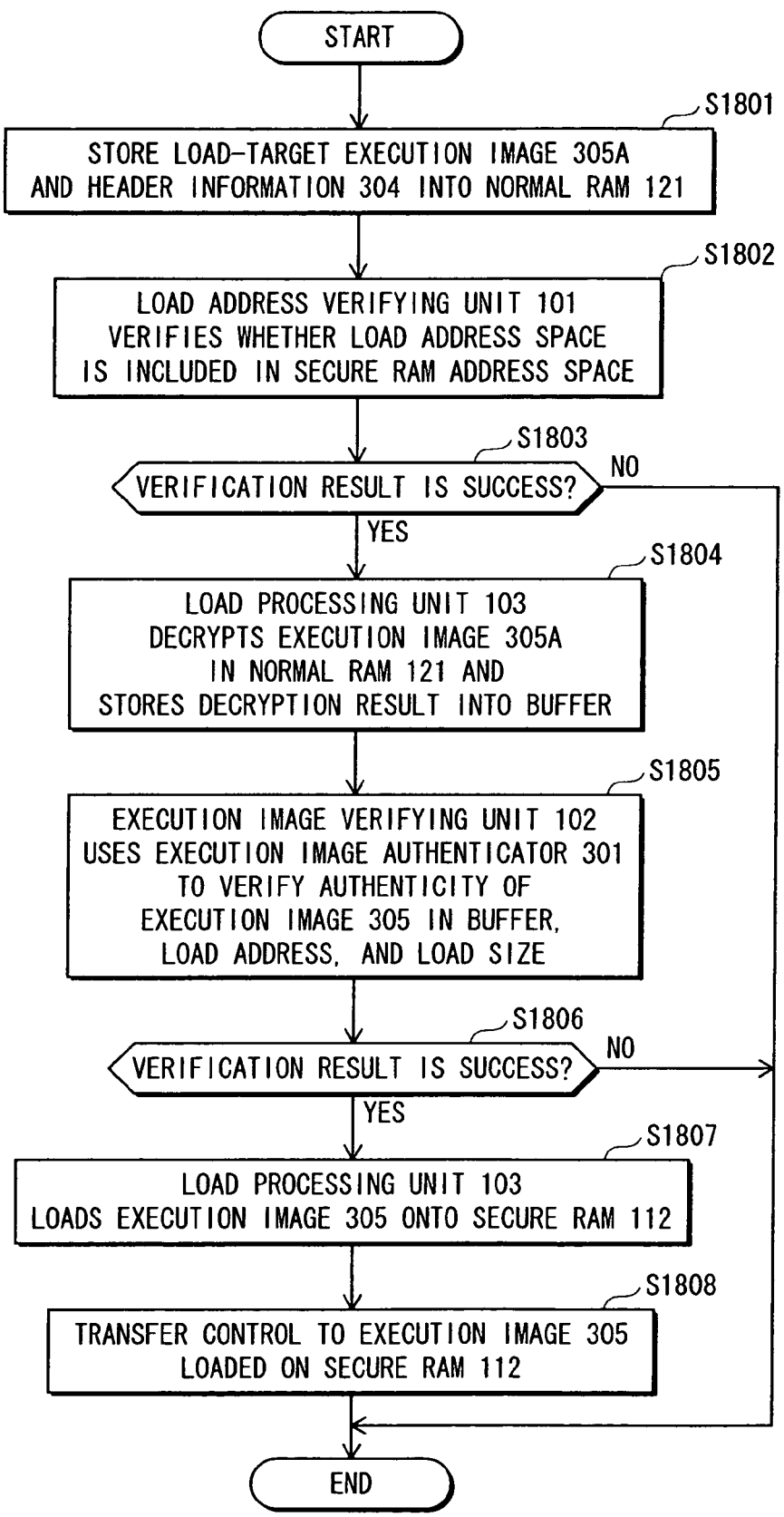
FIG. 18 is a flowchart showing the procedures of loading the execution image being a target of loading in Modification 8 of the present invention.

FIG. 18 is a flowchart showing the procedures for loading the execution image 305a, which is a load target, onto the secure RAM 112. Steps S1801 to S1803 are the same as steps S401 to S403 in FIG. 4. If the verification result is success (Yes in step S1803), the load processing unit decrypts the execution image 305*a* having been stored in the normal RAM 121 and stores the execution image 305, which is obtained as a result of the decryption, into the buffer (step S1804). If the verification result is failure (No in step S1803), the process is ended. The execution image verifying unit verifies the authenticity of the decrypted execution image, load address, and load size using the execution image authenticator 301 (step S1805). If the verification result is success (Yes in step S1806), the load processing unit loads the execution image 305 onto the secure RAM 112 (step S1807), and transfer the control to the loaded execution image 305 (step S1808). If the verification result is failure (No in step S1806), the load processing unit ends the process without loading the execution image 305 onto the secure RAM 112.

In the present modification, as described above, the execution image is developed in an intermediate buffer before the execution image is loaded onto the secure RAM, and verifies the authenticity of the execution image developed in the buffer. The load processing unit loads the execution image onto the secure RAM if the execution image verifying unit verifies that the execution image is authentic; and the load processing unit does not load the execution image onto the secure RAM if the execution image verifying unit does not verify that the execution image is authentic.

<Supplementary Notes>

Up to now, embodiments of the present invention have been described. However, the present invention is not limited to the above-described embodiments, but may include other modifications and the like such as the following.

Each device described above may be, specifically, a computer system including a microprocessor, a ROM, a RAM, a hard disk unit, a display unit, a keyboard, a mouse and the like. A computer program is recorded in the RAM or the hard disk unit. Each device achieves its functions as the microprocessor operates in accordance with the computer program. Here, the computer program is composed of a plurality of instruction codes that instruct the computer so as to achieve certain functions.

Part or all of the constituent elements of each device described above can be realized as one system LSI (Large Scale Integration). The system LSI is a super-multifunctional LSI manufactured by integrating a plurality of constituent units on one chip, and more specifically is a computer system including a microprocessor, a ROM, a RAM and the like. A computer program is recorded in the RAM. The system LSI achieves its functions as the microprocessor operates in accordance with the computer program.

Each portion of the constituent elements of each device described above can be realized separately on one chip. Also, part or all of the portions of the constituent elements of each device can be realized on one chip.

It should be noted here that although the term LSI is used here, it may be called IC, LSI, super LSI, ultra LSI or the like, depending on the level of integration. The integrated circuit is not limited to the LSI, but may be achieved by a dedicated circuit or a general purpose processor. It is also possible to achieve the integrated circuit by using the FPGA (Field Programmable Gate Array) that can be re-programmed after it is manufactured, or a reconfigurable processor that can reconfigure the connection and settings of the circuit cells inside the LSI.

Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

Part or all of the constituent elements of each device described above can be realized as a lone module or an IC card that can be attached and detached to/from each device. The module or IC card is a computer system including a microprocessor, a ROM, a RAM and the like. The module or IC card may includes the above-mentioned super-multifunctional LSI. The module or IC card achieves its functions as the microprocessor operates in accordance with a computer program. The module or IC card may be tamper-resistant.

The present invention may be the methods described above, a computer program for achieving the methods in a computer, or a digital signal that represents the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the computer program or the digital signal recorded on any of the aforementioned recording mediums.

Furthermore, the present invention may be the computer program or the digital signal transmitted on a electric communication line, a wireless or wired communication line, a network of which the Internet is representative, or data broadcasting.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

In Embodiment 1 described above, the execution image authenticator 301 is data that is used for authentication and is generated by applying a hash algorithm to data that includes at least the load address 302, the load size 303, and the execution image 305. However, not limited to this, the execution image authenticator 301 may be data that is used for authentication and is generated by applying a hash algorithm to data that includes at least the load address 302 and the execution image 305. Similarly, the execution image authenticator 301 may be data that is used for authentication and is generated by applying a hash algorithm to data that includes the load size 303 and the execution image 305.

In the above-described embodiments, description of basic software (operating system) that operates on the processor is omitted. When basic software is present, the basic software may control/call the program loader. Also, after the program loader ends a process normally, it may transfer the control to the execution image via the basic software, not directly to the loaded execution image. The program loader may be implemented in software, as part of the basic software. In this case, the program loader is safe when it is stored in a ROM that is provided within the processor, since there is no possibility that the program loader is tampered.

In the above-described embodiments, after the load processing unit loads an execution image onto the secure ROM, the execution image verifying unit verifies the authenticity of the loaded execution image, using the execution image authenticator. However, the execution image may be expanded in a buffer before it is loaded onto a secure RAM. And then if the authenticity of the execution image is verified by the execution image verifying unit, the load processing unit may load the execution image onto the secure RAM.

In the above-described embodiments, a verification using a hash value is performed, and if a hash value generated by the execution image verifying unit matches the execution image authenticator, the authenticity is verified. However, not limited to this, a digital signature verification may be performed. In the digital signature verification, an authenticator, which is generated by attaching a digital signature to data that includes the load address 302, the load size 303, and the execution image 305, is used. In the digital signature verification, for example, a signature S and a pair (r, x) are substituted for a congruent expression "$g^S \equiv y^r r^x \bmod p$", and with respect to the result, it is verified whether or not "$g^S$" matches "$y^r r^x \bmod p$". If "$g^S$" matches "$y^r r^x \bmod p$", the authenticity is verified. Here, in the above congruent expression, "$r = g^k \bmod p$" is satisfied, where "k" is a random number.

In the above-described embodiments, the input/output unit 122 receives (downloads) a load-target object, which is to be processed by the data processing device 120, from outside of the device and stores the received object in the normal RAM 121. However, not limited to this construction, the data processing device 120 may include a ROM 123, and a program preliminarily stored in the ROM 123 may be loaded onto the secure RAM 112 to be run. Alternatively, the data processing device 120 may include an EEPROM 124, and a program that is input via the input/output unit 122 may be stored in the EEPROM 124, and the program may be loaded onto the secure RAM 112 to be run.

In the above-described embodiments, the execution image is encrypted. However, in the case where it is important only that the execution image is loaded onto the secure RAM 112 without being tampered, that is to say, in the case where the algorithm implemented in the program is not secret, but the processing method or data need be protected from tampering, the execution image may not necessarily be encrypted.

Embodiment 3 described above may be modified such that a program loader user may determine whether or not to execute the load address restoring function. In this case, the header information in the program may include data that is used to determine whether or not to execute the load address restoring function, or information that is used to determine whether or not to execute the load address restoring function may be set in hardware.

Embodiment 3 described above may be modified such that it is possible to verify the load address using the load address restore information, before the process of loading the program is performed.

Embodiment 3 described above may be modified such that the program loader can extract a load address embedded in an execution image, by using the load address restore information. With such a construction, it is possible to perform loading even if the header information does not include a load address. This construction is achieved by performing a restore process of extracting a load address from an execution image, each time loading is performed. This eliminates the need for the header information to include the load address, and makes it possible to hide the load address itself.

Also, in the case where only the load address need to be restored, the data, which is obtained as a result of performing a reversible operation using the load address and the data stored in a predetermined area of an original execution image, may be used as the load address restore information. In this case, the data stored in the predetermined area is not replaced. With this construction, it is possible to obtain a load address by performing a reversed operation of the reversible operation on the data stored in the predetermined area, using the load address restore information. Furthermore, since the data stored in the predetermined area has not been replaced and is the same as that in the original execution image, the execution of the process for restoring the original execution image (corresponding to step S1112 in Embodiment 3) can be omitted.

Embodiment 3 described above may be modified such that the load address restoring unit determines whether or not to perform the load address restore process. In this case, the header information may be provided with a flag that indicates whether or not to perform the restore process, and a judgment may be made based on the flag.

Embodiment 3 described above may be modified such that the load address restoring unit 104 determines whether or not to output a log of the load address restore process to notify the user of details of the load address restore process. In this case, the header information may be provided with data that is used to determine whether or not to output a log of the load address restore process, or information that is used to determine whether or not to output a log of the load address restore process may be set in hardware.

Embodiment 3 described above may be modified such that a provider of a device, in which the program loader is loaded, may determine whether or not to execute the load address restoring function. In this case, the result of the determination may be fixed in hardware, or may be achieved using an electric fuse.

Any reversible operation may be used as the calculation explained with reference to FIG. 14. The calculations 822 and 1442 may be different from each other.

The construction shown in FIG. 14 may be modified such that the extracted load address 1431 is compared with the loaded address to judge whether or not they match each other. If they match, it can be determined that the execution image has been tampered with, and thus the load processing unit performs a process so that the loaded program cannot be executed. If the extracted load address 1431 does not match the loaded address, a reversible operation is performed using the extracted load address 1431 and the data at a position that is the predetermined offset 506 away from the start of the execution image 505, and the data at the position is replaced with the result of the reversible operation. The execution image after the replacement is subjected to the verification on its authenticity.

The flowchart shown in FIG. 16 may be modified such that (i) the steps of the verification process using the load address and of the judgment on the verification result (steps S1602 and S1603) and (ii) the steps of the verification process by comparison between the load address space and the secure RAM space and of the judgment on the verification result (steps S1604 and S1605) are performed in the reversed order.

The phrase "load-destination information" used in the claims indicates information that is used for determining the load destination, and includes either or both of the load address and the load size that are described in the embodiments above.

It should be noted that the above-described secure mechanism for RAM may be achieved by a protection method using a virtual address conversion mechanism, or a method in which a control on the CPU is used. In the case of the protection method using a virtual address conversion mechanism, a program that accesses a secure memory can be created only by a programmer who knows physical addresses of the secure memory. More specifically, in the virtual address conversion mechanism, the range of the physical addresses that can be converted from a virtual memory is limited to a range of a normal memory.

The above-described construction prevents a program, which was implemented using a virtual address, from accessing the secure memory.

Also, in the case of the method in which a control on the CPU is used, the CPU can operate in either a secure mode or a normal mode, where only a program having a privilege can select the secure mode, and when operating in the normal mode, the CPU does not access the secure memory.

In Embodiments 1-3, the program loader, CPU, and secure RAM are included in one processor. However, not limited to the construction, the construction of the present invention may not necessarily be achieved as one processor in so far as data can be transferred safely between the program loader, CPU, and secure RAM.

The present invention may be any combination of the above-described embodiments and modifications.

INDUSTRIAL APPLICABILITY

The program loader of the present invention loads software with high security level only onto a secure memory space, producing an advantageous effect of minimizing the chance of software being analyzed by a malicious party. The program loader of the present invention is thus useful for, for example, processors for embedded devices that deal with software to be protected.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A non-transitory computer-readable recording medium having a program loader recorded thereon, the program loader for loading a program from a recording medium into a memory in accordance with load-destination information,
   wherein the program is recorded onto the recording medium in a form of a load object,
   wherein the load object includes the program, the load-destination information, an authenticator, and restore information,
   wherein the load-destination information identifies a memory area of the memory, the identified memory area being part of an address space in the memory, such that an execution image of the program is to be stored in the address space of the memory,
   wherein the authenticator is a value that, on a presumption that neither the program nor the load-destination information has been tampered with, is unique to a combination of the program and the load-destination information, the value of the authenticator being calculated in advance before the program is provided to a user,
   wherein data at a predetermined position of the program is replaced with a result of a reversible operation performed using the data at the predetermined position and the load-destination information, the data being replaced after the value of the authenticator is calculated and before the program is provided to the user,
   wherein the restore information is used to restore the load-destination information when the load-destination information has been tampered with,
   wherein the program loader causes a computer to function as:
      an obtaining unit operable to obtain the load-destination information from the recording medium having the program recorded thereon;
      a loading unit operable to load the program into the memory area identified by the load-destination information; and
      a verifying unit operable to verify whether or not the program loaded by the loading unit and the load-destination information have been tampered with,
   wherein, the verifying unit, when the program is executed, replaces the data at the predetermined position of the loaded program with a result of a reversed calculation of the reversible operation performed using the data at the predetermined position and the load-destination information, calculates a value unique to a combination of (i) the loaded program after the data at the predetermined position of the loaded program is replaced with the result of the reversed calculation, and (ii) the load-destination information, and compares the value calculated by the verifying unit with the value of the authenticator,
   wherein the program loader further causes the computer to function as a load-destination information restore unit operable to, when, as a result of the comparison performed by the verifying unit, the value calculated by the verifying unit does not match the value of the authenticator, obtain restored load-destination information, which has been determined before the program is provided to the user, by performing a predetermined calculation on the data at the predetermined position of the loaded program by using the restore information,
   wherein the verifying unit further performs a second-time verification of whether or not the loaded program and the load-destination information have been tampered with, by using the restored load-destination information obtained by the load-destination information restore unit, and
   wherein, when the verifying unit verifies, based on the second-time verification, that at least the loaded program has been tampered with, the loading unit performs an invalidation process so that the loaded program cannot be executed, and when the verifying unit verifies, based on the second-time verification, that the loaded program and the load-destination information have not been tampered with, the loading unit prohibits the invalidation process from being performed on the loaded program.

2. The non-transitory computer-readable recording medium of claim 1,
   wherein, before the program is provided to the user, the data at the predetermined position of the loaded program after the verifying unit replaces the data is converted load-destination information obtained by applying a conversion to the load-destination information, such that correct load-destination information can be obtained when a predetermined calculation is performed on the converted load-destination information using the restore information, and
   wherein the load-destination information restore unit obtains the restored load-destination information, which has been embedded before the program is provided to the user, by (i) performing the reversible operation using the data at the predetermined position after the verifying unit replaces the data and the load-destination information included in the load object, so as to restore the data at the predetermined position, and then (ii) performing the reversible operation using the restored data and the restore information.

3. The non-transitory computer-readable recording medium of claim 1,
wherein the program loader further causes the computer to function as an area verifying unit operable to verify, when the program is loaded into the memory in accordance with the load-destination information, whether or not the loaded program is included in a secure area within the memory, and
wherein the verification of whether or not the load-destination information has been tampered with is performed when the area verifying unit verifies that the loaded program is included in the secure area.

4. The non-transitory computer-readable recording medium of claim 1,
wherein the load object includes a flag that indicates whether or not the load-destination information restore unit is to obtain the restored load-destination information by performing the predetermined calculation using the restore information, and
wherein the load-destination information restore unit obtains the restored load-destination information by performing the predetermined calculation using the restore information, when the flag indicates that the load-destination information restore unit is to obtain the restored load-destination information by performing the predetermined calculation.

5. The non-transitory computer-readable recording medium of claim 1,
wherein the load object includes a flag that indicates whether or not the obtaining performed by the load-destination information restore unit is to be informed to the user, and
wherein the obtaining performed by the load-destination information restore unit is informed to the user, when the flag indicates that the obtaining performed by the load-destination information restore unit is to be informed to the user.

6. A processor produced as one chip comprising:
the program loader defined in claim 1; and
a program running unit operable to run the program loaded by the program loader when the verifying unit verifies that the load-destination information has not been tampered with.

7. A program loading method for loading a program from a recording medium into a memory in accordance with load-destination information,
wherein the program is recorded onto the recording medium in a form of a load object,
wherein the load object includes the program, the load-destination information, an authenticator, and restore information,
wherein the load-destination information identifies a memory area of the memory, the identified memory area being part of an address space in the memory, such that an execution image of the program is to be stored in the address space of the memory,
wherein the authenticator is a value that, on a presumption that neither the program nor the load-destination information has been tampered with, is unique to a combination of the program and the load-destination information, the value of the authenticator being calculated in advance before the program is provided to a user,
wherein data at a predetermined position of the program is replaced with a result of a reversible operation performed using the data at the predetermined position and the load-destination information, the data being replaced after the value of the authenticator is calculated and before the program is provided to the user,
wherein the restore information is used to restore the load-destination information when the load-destination information has been tampered with,
wherein the program loading method comprises:
obtaining the load-destination information from the recording medium having the program recorded thereon;
loading the program into the memory area identified by the load-destination information; and
verifying whether or not the program loaded by the loading of the program and the load-destination information have been tampered with,
wherein, the verifying, when the program is executed, replaces the data at the predetermined position of the loaded program with a result of a reversed calculation of the reversible operation performed using the data at the predetermined position and the load-destination information, calculates a value unique to a combination of (i) the loaded program after the data at the predetermined position of the loaded program is replaced with the result of the reversed calculation, and (ii) the load-destination information, and compares the value calculated by the verifying with the value of the authenticator,
wherein the program loading method further comprises, when, as a result of the comparison performed by the verifying, the value calculated by the verifying does not match the value of the authenticator, obtaining restored load-destination information, which has been determined before the program is provided to the user, by performing a predetermined calculation on the data at the predetermined position of the loaded program by using the restore information,
wherein the verifying further performs a second-time verification of whether or not the loaded program and the load-destination information have been tampered with, by using the restored load-destination information obtained by the obtaining of the restored load-destination information, and
wherein, when the verifying verifies, based on the second-time verification, that at least the loaded program has been tampered with, the loading of the program performs an invalidation process so that the loaded program cannot be executed, and when the verifying verifies, based on the second-time verification, that the loaded program and the load-destination information have not been tampered with, the loading of the program prohibits the invalidation process from being performed on the loaded program.

8. An integrated circuit for loading a program from a recording medium into a memory in accordance with load-destination information,
wherein the program is recorded onto the recording medium in a form of a load object,
wherein the load object includes the program, the load-destination information, an authenticator, and restore information,
wherein the load-destination information identifies a memory area of the memory, the identified memory area being part of an address space in the memory, such that an execution image of the program is to be stored in the address space of the memory,
wherein the authenticator is a value that, on a presumption that neither the program nor the load-destination information has been tampered with, is unique to a combination of the program and the load-destination information, the value of the authenticator being calculated in advance before the program is provided to a user,
wherein data at a predetermined position of the program is replaced with a result of a reversible operation performed using the data at the predetermined position and the load-destination information, the data being replaced after the value of the authenticator is calculated and before the program is provided to the user,
wherein the restore information is used to restore the load-destination information when the load-destination information has been tampered with,
wherein the integrated circuit comprises:
- an obtaining unit operable to obtain the load-destination information from the recording medium having the program recorded thereon;
- a loading unit operable to load the program into the memory area identified by the load-destination information; and
- a verifying unit operable to verify whether or not the program loaded by the loading unit and the load-destination information have been tampered with,
wherein, the verifying unit, when the program is executed, replaces the data at the predetermined position of the loaded program with a result of a reversed calculation of the reversible operation performed using the data at the predetermined position and the load-destination information, calculates a value unique to a combination of (i) the loaded program after the data at the predetermined position of the loaded program is replaced with the result of the reversed calculation, and (ii) the load-destination information, and compares the value calculated by the verifying unit with the value of the authenticator,
wherein the integrated circuit further includes a load-destination information restore unit operable to, when, as a result of the comparison performed by the verifying unit, the value calculated by the verifying unit does not match the value of the authenticator, obtain restored load-destination information, which has been determined before the program is provided to the user, by performing a predetermined calculation on the data at the predetermined position of the loaded program by using the restore information,
wherein the verifying unit further performs a second-time verification of whether or not the loaded program and the load-destination information have been tampered with, by using the restored load-destination information obtained by the load-destination information restore unit, and
wherein, when the verifying unit verifies, based on the second-time verification, that at least the loaded program has been tampered with, the loading unit performs an invalidation process so that the loaded program cannot be executed, and when the verifying unit verifies, based on the second-time verification, that the loaded program and the load-destination information have not been tampered with, the loading unit prohibits the invalidation process from being performed on the loaded program.

\* \* \* \* \*